United States Patent
England et al.

(10) Patent No.: US 11,632,521 B2
(45) Date of Patent: Apr. 18, 2023

(54) AUDIO/VIDEO ELECTRONIC DEVICE

(71) Applicant: Amazon Technologies, Inc., Seattle, WA (US)

(72) Inventors: Matthew J. England, Santa Monica, CA (US); Christopher Loew, Palo Alto, CA (US); Chung-Sen Huang, Taipei (TW); Oleksii Krasnoschok, Kiev (UA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/588,523

(22) Filed: Sep. 30, 2019

(65) Prior Publication Data
US 2021/0099676 A1 Apr. 1, 2021

(51) Int. Cl.
*H04N 7/18* (2006.01)
*H04N 5/225* (2006.01)
(Continued)

(52) U.S. Cl.
CPC ........... *H04N 7/181* (2013.01); *H04N 5/2253* (2013.01); *H04N 5/247* (2013.01); *H01Q 1/22* (2013.01)

(58) Field of Classification Search
CPC ........ H04N 7/186; H04N 5/243; H04N 5/144; H04N 5/23219; H04N 5/2351; H04N 5/2353; H04N 5/2355
See application file for complete search history.

(56) References Cited

U.S. PATENT DOCUMENTS 4,027,329 A * 5/1977 Coutta ..................... G07G 3/00
348/150
4,764,953 A 8/1988 Chern et al.
(Continued)

FOREIGN PATENT DOCUMENTS

CN 2585521 11/2003
CN 2792061 6/2006
(Continued)

OTHER PUBLICATIONS

PCT Search Report and Written Opinion dated Dec. 9, 2020 for PCT Application No. PCT/US2020/050969, 15 pages.
(Continued)

*Primary Examiner* — Peet Dhillon
(74) *Attorney, Agent, or Firm* — Lee & Hayes, P.C.

(57) ABSTRACT

An audio/video recording and communication device (A/V device) including one or more motion sensors arranged in a first row, a first camera, one or more second cameras arranged in a second row, a first cover disposed over the one or more motion sensors, a second cover disposed over the first camera, and a third cover disposed over the one or more second cameras. The one or more motion sensors may include a first motion sensor having a first orientation, a second motion sensor having a second orientation, and a third motion sensor having a third orientation. Additionally, the one or more second cameras may include a camera having a first orientation, a camera having a second orientation, and a camera having a third orientation. In some instances, the first camera is located between the one or more motion sensors and the one or more second cameras.

21 Claims, 12 Drawing Sheets

(51) Int. Cl.
*H04N 5/247* (2006.01)
*H01Q 1/22* (2006.01)

(56) References Cited

U.S. PATENT DOCUMENTS

| | | |
|---|---|---|
| 5,428,388 A | 6/1995 | von Bauer et al. |
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2013/0016484 A1* | 1/2013 | Yoo .................. H04B 1/3833 361/752 |
| 2013/0057695 A1 | 3/2013 | Huisking |
| 2014/0146132 A1* | 5/2014 | Bagnato .............. G03B 37/04 348/36 |
| 2014/0267716 A1 | 9/2014 | Child et al. |
| 2015/0035987 A1 | 2/2015 | Fernandez |
| 2015/0163463 A1 | 6/2015 | Hwang et al. |
| 2015/0213838 A1* | 7/2015 | Dinev ................. G11B 27/031 386/224 |
| 2018/0047266 A1* | 2/2018 | Siminoff ............ H04M 11/025 |
| 2018/0165933 A1 | 6/2018 | Siminoff |
| 2018/0176512 A1 | 6/2018 | Siminoff |
| 2018/0227507 A1* | 8/2018 | Siminoff .............. H04N 7/188 |
| 2018/0233010 A1* | 8/2018 | Modestine ....... G08B 13/19671 |
| 2018/0302569 A1* | 10/2018 | Cabral ............ H04N 5/232939 |
| 2018/0338129 A1* | 11/2018 | Hejl ..................... H04N 13/239 |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| GB | 2429098 | 2/2007 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

OTHER PUBLICATIONS

International Preliminary Report on Patentability for PCT Application No. PCT/US20/50969, dated Apr. 14, 2022.

* cited by examiner

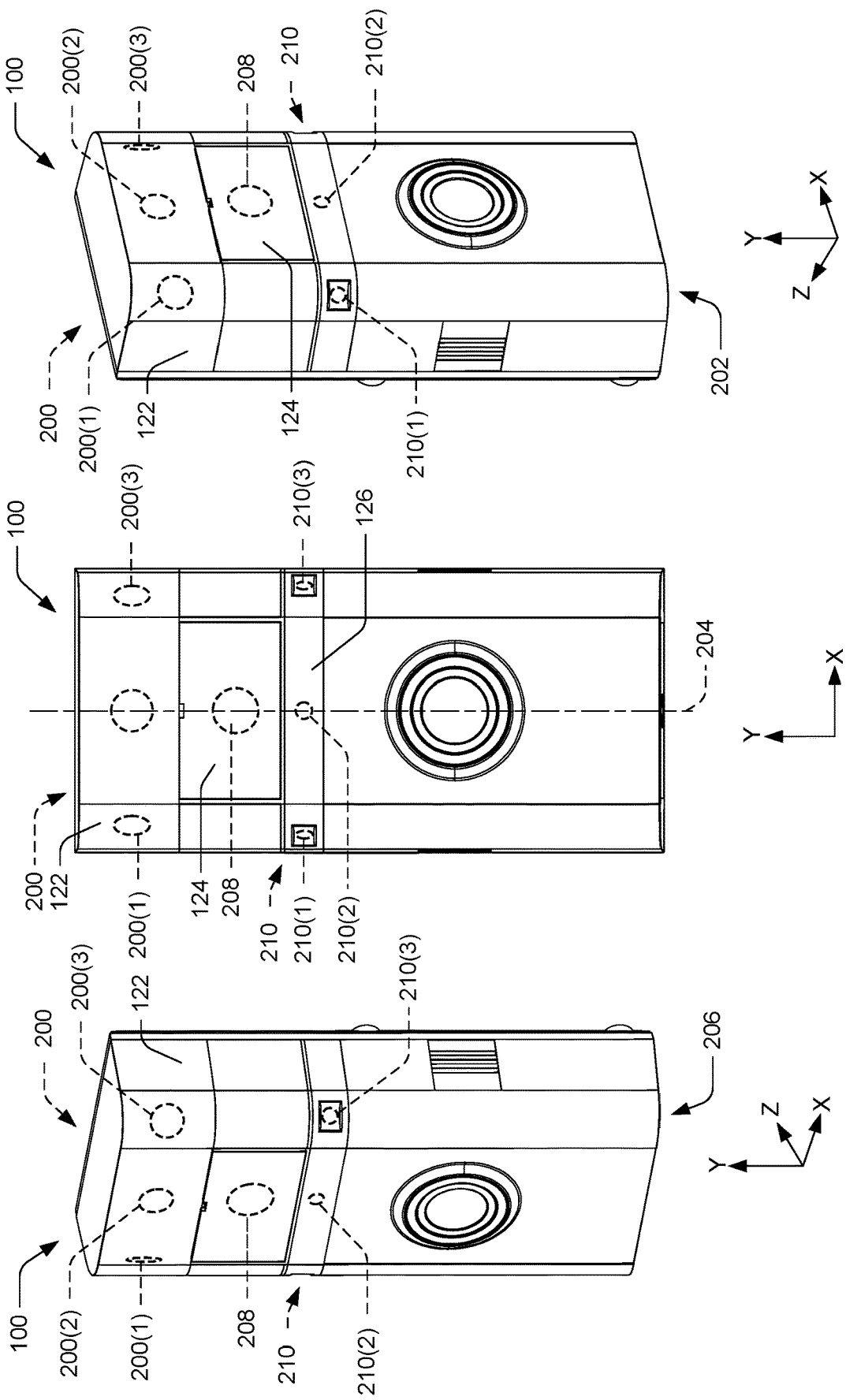

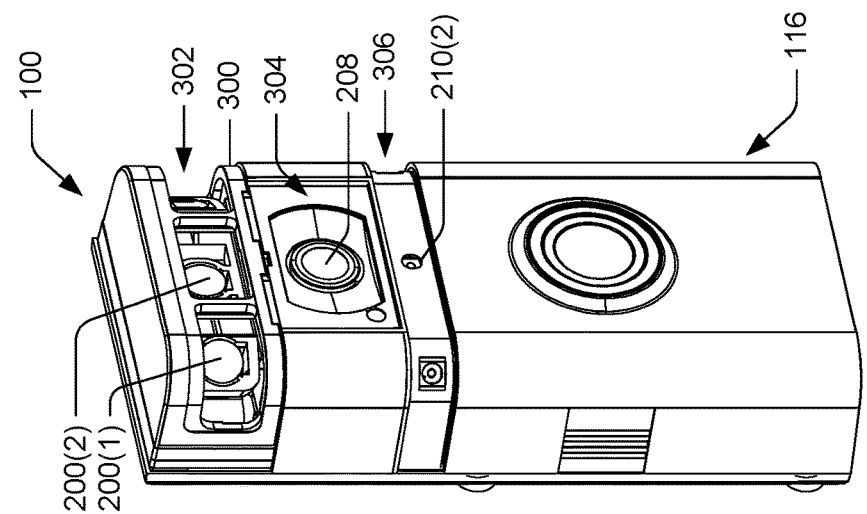
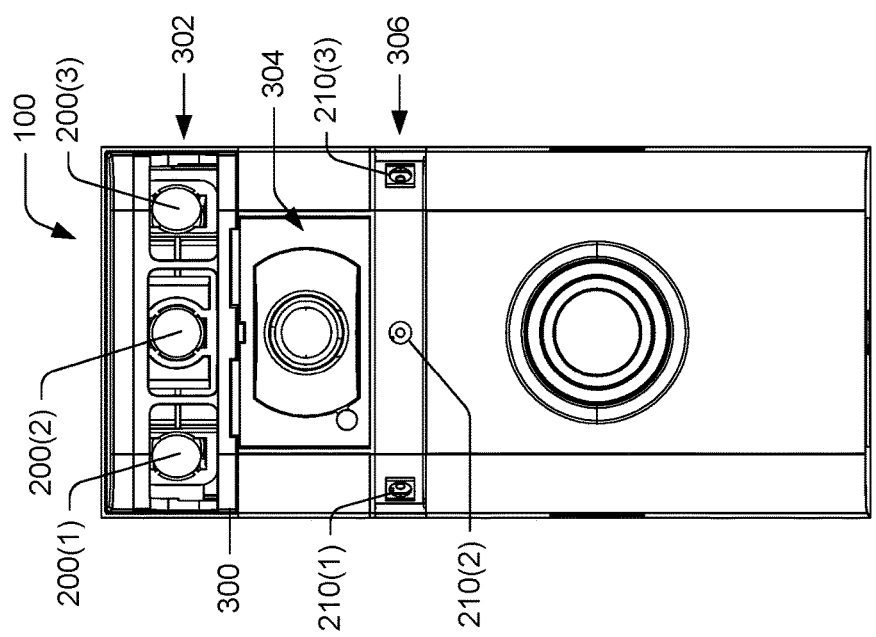
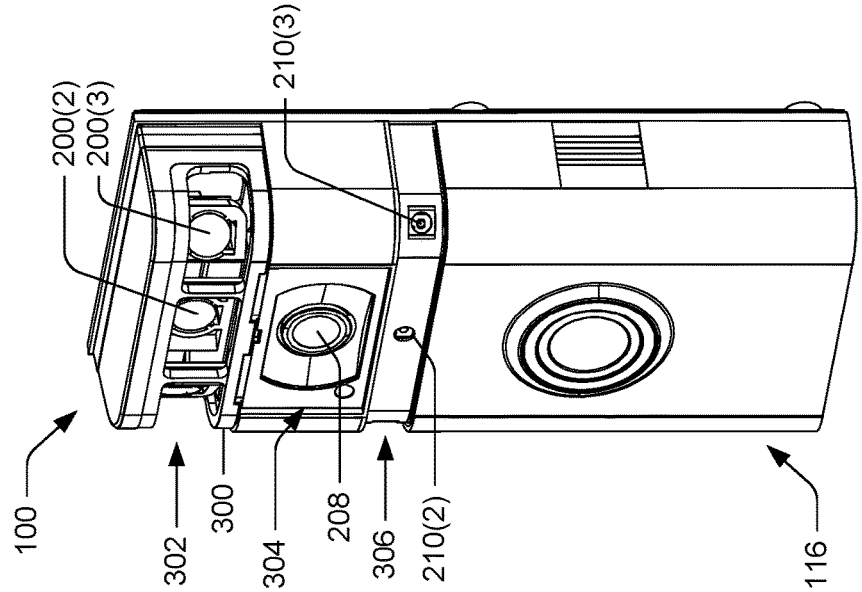

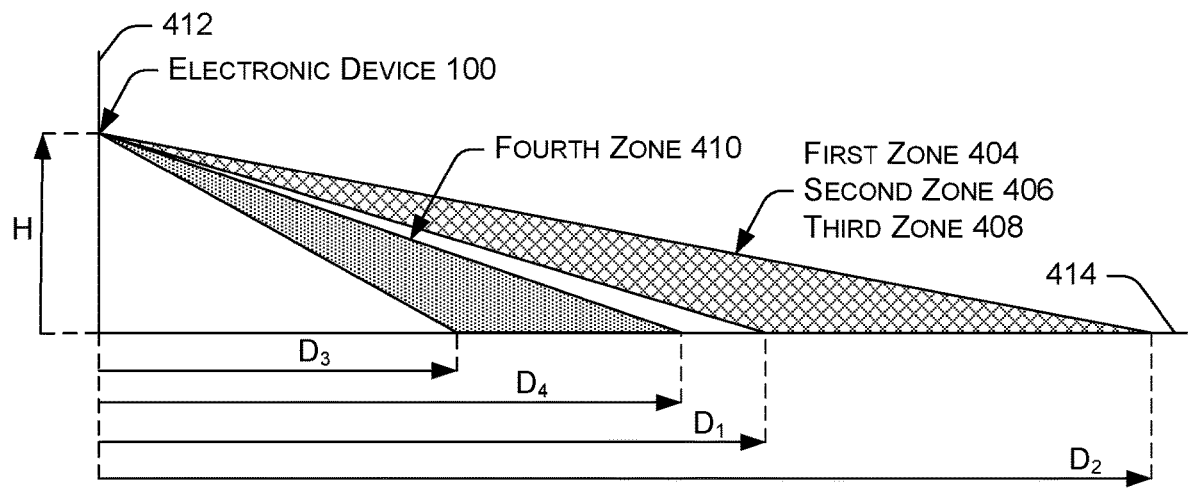
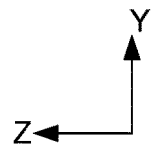
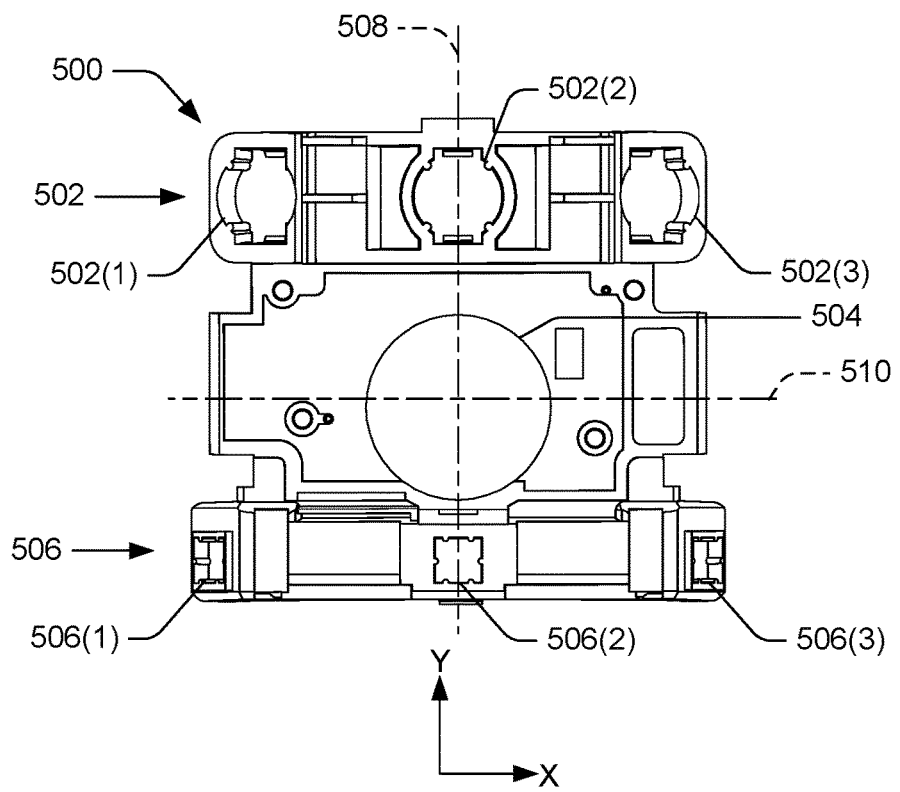
FIG. 5

AUDIO/VIDEO ELECTRONIC DEVICE

BACKGROUND

Home security is a concern for many homeowners and renters. Those seeking to protect or monitor their homes often wish to have video and audio communications with visitors, for example, those visiting an external door or entryway. Audio/video recording and communication devices (A/V devices), such as doorbells, provide this functionality. For example, audio and/or video captured by an A/V device may be uploaded to the cloud and recorded on a server. A user of the A/V device may then later listen to the audio and/or view the video footage.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

FIG. 2A illustrates a first side view of the electronic device of FIG. 1, showing example components within the electronic device, according to an aspect of the present disclosure.

FIG. 2B illustrates a front view of the electronic device of FIG. 1, showing example components within the electronic device, according to an aspect of the present disclosure.

FIG. 2C illustrates a second side view of the electronic device of FIG. 1, showing example components within the electronic device, according to an aspect of the present disclosure.

FIG. 3A illustrates a first side view of the electronic device of FIG. 1, with covers removed to show example components of the electronic device, according to an aspect of the present disclosure.

FIG. 3B illustrates a front view of the electronic device of FIG. 1, with the covers removed to show example components of the electronic device, according to an aspect of the present disclosure.

FIG. 3C illustrates a second side view of the electronic device of FIG. 1, with the covers removed to show example components of the electronic device, according to an aspect of the present disclosure.

FIG. 5 illustrates a front view of an example mount of the electronic device of FIG. 1, according to an aspect of the present disclosure.

DETAILED DESCRIPTION

Figure 1:
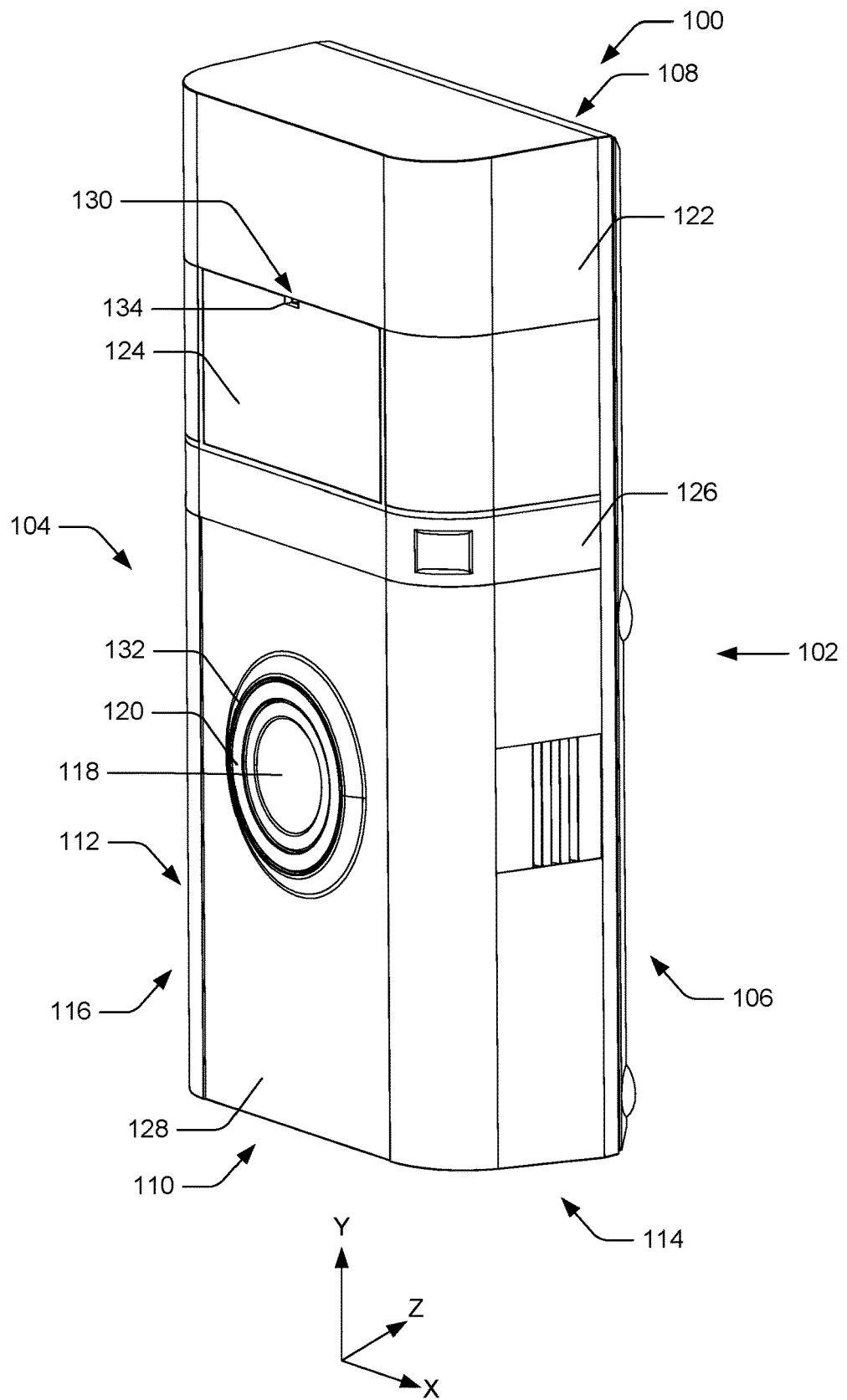
FIG. 1 illustrates a perspective view of an example electronic device, according to an aspect of the present disclosure.

This application describes an electronic device, such as an audio/video recording and communication device (A/V device), having improved image, audio, and video capturing characteristics. In some examples, the electronic device according to this application may record audio and/or video within an environment in which the electronic device resides. The electronic device may include one or more motion sensors (e.g., passive infrared (PIR) sensors) for detecting motion, and/or cameras for capturing images (e.g., videos). In some instances, the PIR sensor(s) and/or the cameras may be disposed at different orientations relative to the electronic device to expand a field-of-view (FOV) of the electronic device, thereby enhancing the ability of the electronic device to alert users to, and/or provide notifications of, motion in the area about the electronic device.

In some instances, the electronic device, or a housing of the electronic device, may include a front, a back, a top, a bottom, and adjacent lateral sides. In some instances, the PIR sensors and/or the cameras may be arranged across the front and/or the sides of the electronic device. For example, the PIR sensors and/or the cameras may extend horizontally across the front and/or onto the sides of the electronic device. In some instances, one or more of the PIR sensors and/or one or more of the cameras may be disposed at corners of the electronic device. For example, the electronic device may include three PIR sensors arranged in a row across the electronic device. A first PIR sensor may be disposed at the front and/or a first side of the electronic device, such as at a first corner, a second PIR sensor may be disposed at the front of the electronic device, and a third PIR sensor may be disposed at the front and/or a second side of the electronic device, such as at a second corner.

In some instances, the first PIR sensor may be oriented in a first direction, the second PIR sensor may be oriented in a second direction that is different than the first direction, and the third PIR sensor may be oriented in a third direction that is different than the first direction and/or the second direction. In some instances, the PIR sensors may be oriented at different angles relative to a central longitudinal axis of the electronic device.

The arrangement of the PIR sensors, as well as their respective orientations, may have a FOV in front of and to the sides of the electronic device. For example, the first PIR sensor, or the first direction, may be oriented to detect motion in front of and/or to the first side of the electronic device. The second PIR sensor, or the second direction, may be oriented to detect motion in front of the electronic device. Additionally, the third PIR sensor, or the third direction, may be oriented to detect motion in front of and/or to the second side of the electronic device. In some instances, the PIR sensors may include a horizontal FOV of approximately or substantially 90 degrees, 120 degrees, 180 degrees, and/or any other angle. Further, in some instances, the PIR sensors may include a vertical FOV of approximately or substantially 60 degrees, 90 degrees, 120 degrees, and/or any other angle.

The electronic device may also include cameras located on the front and/or the sides of the electronic device. In some instances, the cameras may include a first camera disposed vertically below the PIR sensors and/or above one or more additional cameras, such as a second camera, a third camera, and/or a fourth camera. The second camera, the third camera, and/or the fourth camera may be arranged across the front and/or the sides of the electronic device, beneath the first camera. In some instances, the second camera, the third camera, and/or the fourth camera may be arranged in a row that horizontally extends across the electronic device. For example, the first camera may be disposed at the front of the electronic device and oriented in the second direction. Accordingly, the first camera may record image data in front of and/or to the sides of the electronic device. In some instances, the first camera may include a horizontal FOV of approximately or substantially 120 degrees, 165 degrees, 180 degrees, and/or any other angle. Additionally, in some instances, the first camera may include a vertical FOV of approximately or substantially 50 degrees, 80 degrees, 120 degrees, and/or any other angle.

In some instances, the second camera may be disposed at the front and/or the first side of the electronic device and oriented in a fourth direction. In some instances, the second camera may be disposed at, or proximate to, the first corner, such that the second camera may record image data in front of and/or to the first side of the electronic device. Additionally, the third camera may be disposed at the front of the electronic device and oriented in the second direction. The third camera may therefore record image data in front of and/or to the sides of the electronic device. Further, the fourth camera may be disposed at the front and/or the second side of the electronic device and oriented in a fifth direction. In some instances, the fourth camera may be disposed at, or proximate to, the second corner, such that the fourth camera may record image data in front of and/or to the second side of the electronic device.

In some embodiments, the fields of view of the second camera, the third camera, and the fourth camera may overlap, and image data recorded by the second camera, the third camera, and the fourth camera may be stitched together or otherwise combined to form a unified (e.g., panoramic) image. In some instances, the second camera may have a horizontal FOV that overlaps between 10 degrees and 20 degrees with the horizontal FOV of the third camera and/or the third camera may have a horizontal FOV that overlaps between 10 degrees and 20 degrees with a horizontal FOV of the fourth camera, and vice versa. Collectively, the second camera, the third camera, and/or the fourth camera may have a horizontal FOV of approximately or substantially 120 degrees, 160 degrees, 165 degrees, and/or any other angle.

In some instances, collectively, the second camera, the third camera, and/or the fourth camera may have a horizontal FOV that is approximately or substantially the same as the horizontal FOV of the first camera. Further, in some instances, collectively, the second camera, the third camera, and/or the fourth camera may have a vertical FOV of approximately or substantially 50 degrees, 75 degrees, 90 degrees, and/or any other angle.

In some instances, one or more of the PIR sensors may be aligned with one or more of the cameras. For example, the first PIR sensor may be vertically aligned with the second camera, the second PIR sensor may be vertically aligned with the first camera and/or the third camera, and/or the third PIR sensor may be vertically aligned with the fourth camera. Alternatively, one or more of the PIR sensors and one or more of the cameras may include other arrangements. For example, in embodiments in which the PIR sensors have a greater combined horizontal FOV than that of the second camera, the third camera, and the fourth camera, in some instances, the second PIR sensor, the first camera, and/or the third camera may be vertically aligned, while the first PIR sensor and the second camera may not be vertically aligned and/or the third PIR sensor and/or the fourth camera may not be vertically aligned.

In some instances, for example, the second camera and/or the fourth camera may be oriented more inwardly, or toward, the front of the electronic device, as compared to the first PIR sensor and the third PIR sensor, respectively. That is, as the second camera, the third camera, and/or the fourth camera have a collective horizontal FOV that may be smaller than the collective horizontal FOV of the PIR sensors, in some instances, the second camera and/or the fourth camera may be disposed inwardly from the first PIR sensor and the third PIR sensor, respectively, and/or may be oriented more toward the front of the electronic device than toward the sides (or oriented more toward a central longitudinal axis of the electronic device).

In some instances, the PIR sensors may be disposed closer to, or more proximate, the top of the electronic device as compared to the second camera, the third camera, and the fourth camera. Additionally, or alternatively, the second camera, the third camera, and the fourth camera may be disposed closer to, or more proximate, the bottom of the electronic device as compared to the PIR sensors. The first camera may be disposed between the PIR sensors and the second camera, the third camera, and the fourth camera. In this arrangement, the first camera may be located more proximate the top of the electronic device than the second camera, the third camera, and the fourth camera, and located more proximate the bottom of the electronic device than the PIR sensors.

The cameras may include at least a first type of camera and a second type of camera. In some examples, the first type of camera may include a high-resolution camera and the second type of camera may include a low-resolution camera, where resolution may refer to the pixel count of the camera's image sensor (e.g., number of total pixels, number of recorded pixels, number of effective pixels, etc.). As described herein, a camera may be a high-resolution camera when the pixel count of the camera's image sensor is equal to or greater than a threshold pixel count. Additionally, a camera may be a low-resolution camera when the pixel count of the camera's image sensor is equal to or less than the threshold pixel count.

Additionally, or alternatively, in some examples, the first type of camera may include a camera that uses a first amount of power to operate and the second type of camera may include a camera that uses a second amount of power to operate. The second amount of power may be less than the first amount of power. Additionally, or alternatively, in some examples, the first type of camera may include a red-green-blue (RGB) camera and/or another type of color camera, and the second type of camera may include a grayscale camera. Additionally, or alternatively, in some examples, the first type of camera may include a camera with a first size FOV and the second type of camera may include a camera with a second size FOV. In such examples, the first size FOV may be larger than the second size FOV, either horizontally or vertically, or both.

In some instances, the first camera may include the first type of camera and the second camera, the third camera, and the fourth camera may each include the second type of camera. In such embodiments, the electronic device may activate the first camera during first times to generate first image data, and activate the second camera, the third camera, and the fourth camera during second, different times to generate second image data. For example, the electronic device may activate the second camera, the third camera, and/or the fourth camera continuously, during daylight hours (when an amount of ambient light is equal to or greater than a threshold), when the PIR sensors detect possible motion of an object, and/or during other times. Additionally, the electronic device may activate the first camera when the PIR sensors detect possible motion of an object, and/or when the second camera, the third camera, and/or the fourth camera detect an object, and/or after receiving a live view request, and/or at other times.

The electronic device may include one or more covers disposed over one or more of the PIR sensors and/or one or more of the cameras. For example, a first cover may be disposed over the PIR sensors, a second cover may be disposed over the first camera, and/or a third cover may be disposed over the second camera, the third camera, and/or the fourth camera. In some instances, one or more of the covers may couple to a frame or housing of the electronic device and wrap around the front and/or the sides of the electronic device. For example, as the first PIR sensor and/or the third PIR sensor may be disposed at corners of the electronic device, the first cover may at least partially wrap around the corners and couple to the sides of the electronic device. Additionally, as the second camera and/or the fourth camera may be disposed at corners of the electronic device, the third cover may at least partially wrap around the corners and couple to the sides of the electronic device. The covers may also conceal the PIR sensors and/or the cameras from view. For example, the first cover may comprise a material that is transparent to light in the infrared spectrum, but opaque to light in the visible spectrum.

In some instances, one of more of the covers of the electronic device may include materials and/or features that permit the PIR sensors to detect motion and the cameras to record images. In some instances, one or more of the covers may include cutouts or recesses (may also be referred to as indentations) for accommodating sensing or imaging by the PIR sensors and/or the cameras. For example, the third cover may include a first recess and a second recess disposed at corners of the third cover, such that the first recess is disposed over, in front of, or within a FOV of the second camera, and the second recess may be disposed over, or in front of, or within a FOV of the fourth camera. In other words, the first recess and the second recess may be disposed at the first corner and the second corner, or proximate to the first corner and the second corner, respectively, of the electronic device.

In some instances, the first recess and/or the second recess may include planar surfaces that enhance a quality of image data recorded by the second camera and the fourth camera, respectively. For example, the planar surfaces may be perpendicular to an axis of a lens of the second camera and an axis of a lens of the fourth camera, respectively. The planar surfaces of the recesses may enhance the quality of images and video recorded by the second camera and the fourth camera by reducing or eliminating distortion that would otherwise be caused by light passing through the rounded corners of the third cover. Recording clear images may enhance the effectiveness of the electronic device in providing alerts and/or creating video evidence of criminal acts.

The front of the electronic device may include button(s) or other touch-sensitive surfaces configured to receive tactile input. In response to receiving tactile input, such as a touch input or a button press, the electronic device may perform one or more actions, such as unlocking/locking a door, arming/disarming a security system, transmitting a notification to one or more users, causing the electronic device to enter one or more modes, and so forth. In some instances, the electronic device may include a button located vertically beneath the third camera, in a direction toward the bottom of the electronic device. In some instances, the button may be vertically aligned with the second PIR sensor, the first camera, and/or the third camera.

The electronic device may include one or more visual indicators to provide visual feedback regarding a task or operation being performed by the electronic device. In some instances, the visual indictor may be located around the button so as to encircle the button. The visual indicator may, in some instances, comprise a light ring, which may be illuminated by one or more light sources, such as light emitting diodes (LEDs), residing within the electronic device. The LEDs may be side-firing LEDs radially arranged around the button and/or oriented toward the button.

In some instances, a light diffuser may be interposed between the light sources and the light ring. The light diffuser may include features, such as recesses or protrusions, that assist in diffusing light from the light sources to increase internal reflection within the light ring and/or the light diffuser. For example, the light diffuser may include serrated edges or ridges disposed adjacent to the light sources to scatter and disperse the light within the light diffuser and toward the light ring. Additionally, or alternatively, the light diffuser may include one or more depressions or thinned regions around its circumference to further diffuse the light in the light ring. Accordingly, in some examples, the light ring may substantially uniformly disperse light from the LEDs so that the light ring has a uniform circular appearance when illuminated.

The electronic device may include one or more network interfaces for communicatively coupling the electronic device to one or more computing devices. The network interface(s) may comprise one or more antenna(s). In some instances, the antennas may be located proximate to the bottom of the electronic device, and/or spaced apart from the PIR sensors that are disposed proximate to the top of the electronic device. Such positioning may, in some instances, reduce interference between the PIR sensors and the antennas. For example, the spacing between the antennas and the PIR sensors may reduce thermal interference caused by heat generated by the antennas, which might otherwise trigger the PIR sensors (e.g., a "false positive" motion detection). The spacing between the antennas and the PIR sensors may reduce electromagnetic interference caused by the PIR sensors, which might otherwise hinder the ability of the antennas to send and receive RF signals.

In some instances, the electronic device may include a first antenna disposed at a first side of the electronic device and a second antenna disposed at a second side of the electronic device. The first antenna may be used to communicate over a first type of network and the second antenna may be used to communicate over a second, different type of network. For example, the electronic device may use the first antenna to communicate over a first network with one or more network devices, such as a server and/or a client device (e.g., a smartphone). In some examples, the first network may include a wireless local area network (WLAN), such as, but not limited to, the Internet, a local intranet, a Personal Area Network (PAN), a Local Area Network (LAN), a Wide Area Network (WAN), and/or the like. The electronic device may further use the first antenna and/or a second antenna to communicate over a second network with one or more network devices, such as a hub device (e.g., a hub of a home automation/security system), an automation device, and/or other electronic devices. In some examples, the second network may include a low-power wide-area network (LPWAN), such as, but not limited to, a chirp spread spectrum (CSS) modulation technology network (e.g., LoRaWAN), an Ultra Narrow Band modulation technology network (e.g., Sigfox, Telensa, NB-IoT, etc.), a sub-gigahertz network, and/or the like.

The back of the electronic device may include features for coupling the electronic device to a structure to provide the PIR sensors and the cameras with their respective FOVs. For example, one or more fasteners may be disposed through the back of the electronic device to mount or secure the electronic device to a surface.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1 illustrates an example electronic device 100. In some instances, the electronic device 100 may include a housing or body 102 having a front 104, a back 106, a top 108, a bottom 110, a first side 112, and a second side 114. In reference to the Cartesian Coordinate System (X, Y, Z), the front 104 may be spaced apart from the back 106 in the Z-direction, the top 108 may be spaced apart from the bottom 110 in the Y-direction, and the first side 112 may be spaced apart from the second side 114 in the X-direction. As shown, the electronic device 100 may include a generally rectangular shape. However, in other instances, the electronic device 100 may be square, circular, spherical, and/or other type of shape. The electronic device 100 may also include an exterior surface 116.

The electronic device 100 may include a button 118 disposed at/in the front 104. In some instances, the button 118 may receive input, such as touch or tactile input, from a user or operator of the electronic device 100. In some instances, the button 118 may be circular in shape. In other instances, the button 118 may include any other shape. In some instances, an exterior profile or surface of the button 118 may be planar, or flush, with the exterior surface 116 at the front 104. In other instances, the button 118 may protrude from the exterior surface 116 at the front 104. In some instances, the button 118 may protrude only slightly from the exterior surface 116 at the front 104 to provide the electronic device with a thin profile or small form factor.

In some instances, a light ring 120 may be disposed at/in the front 104 of the electronic device 100 and may provide a visual indicator corresponding to one or more states of the electronic device 100. In some instances, the light ring 120 may surround or encircle the button 118. Light sources, such as LEDs residing within the electronic device 100 or the body 102, may illuminate the light ring 120. In some instances, the light sources illuminating the light ring 120 may be illuminated statically (e.g., one or more of the light sources illuminated continuously) or dynamically (e.g., one or more of the light sources flashing simultaneously, illuminating one or more of the light sources sequentially, alternating which light sources are illuminated, etc.). The light ring 120 may therefore take a wide range of visual appearances by varying which light sources are on/off, the respective colors of the light sources, and the timing of activating the light sources. In some instances, the LEDs may be side-firing LEDs oriented toward a center of the button 118.

In some instances, the electronic device 100 may include a light diffuser disposed behind the light ring 120 (Z-direction) that serves to diffuse light generated by the LEDs. The light diffuser may diminish or eliminate "hot spots" or "bright spots" throughout the light ring 120. In some instances, the light diffuser and/or the light ring 120 may include serrated edges or ridges disposed adjacent to the LEDs to scatter and disperse the light within the light diffuser and toward the light ring 120. As another example, the light diffuser may include one or more depressions or thinned regions around its circumference to further diffuse the light in the light ring 120. Accordingly, the light ring 120 may substantially uniformly disperse light from the LEDs so that the light ring 120 has a uniform circular appearance when illuminated.

The electronic device 100 may include one or more covers disposed at the front 104, which may wrap around, or extend onto, sides of the electronic device 100, such as the first side 112 and/or the second side 114. In some instances, the covers may conceal and/or be disposed over one or more components of the electronic device 100. For example, one or more covers may be disposed over PIR sensors and/or cameras of the electronic device 100.

In some instances, the electronic device 100 may include a first cover 122, a second cover 124, a third cover 126, and/or a fourth cover 128. In such instances, the first cover 122, the second cover 124, the third cover 126, and the fourth cover 128 may at least partially define the exterior surface 116 of the electronic device 100. As discussed below, in some instances, the first cover 122 may be disposed over one or more PIR sensor(s) of the electronic device 100. Additionally, or alternatively, the second cover 124 and the third cover 126 may be disposed over one or more camera(s) of the electronic device 100. The fourth cover 128 may be disposed over a lower portion of the electronic device 100 and/or antennas of the electronic device 100. The fourth cover 128 may also include an opening 132 for accommodating the button 118 and/or the light ring 120.

In some examples, the first cover 122, the second cover 124, and/or the third cover 126 may include materials that are durable, weatherproof, and/or scratch-resistant. The first cover 122 preferably allows all or most infrared light to pass through it, but may be largely opaque to light in the visible spectrum. The second and third covers 124, 126 preferably allow all or most light, both infrared and visible to pass through. Example materials for the first cover 122, the second cover 124, and the third cover 126 include, but are not limited to, polycarbonate, acrylic, high-density polyethylene, acrylonitrile butadiene styrene (ABS), a combination thereof, and/or any other suitable materials.

The electronic device 100 may include one or more microphones for detecting/recording speech and/or one or more loudspeakers for outputting audio. In some instances, the electronic device 100 may include a microphone port 130 (or port(s)) for channeling sound within the environment to the one or more microphones located within the electronic device 100. In some instances, the microphone port 130 may be disposed between the first cover 122 and the second cover 124 so as to be disposed between one or more PIR sensor(s) and one or more camera(s). In some instances, the second cover 124 may include a notch 134 that forms at least a portion of the microphone port 130, or which comprises the microphone port 130. The microphone port 130 may direct sound to, or allow sound to reach, the one or more microphone(s) of the electronic device 100. That is, the one or more microphone(s) may receive sound, for instance, user speech, via the microphone port 130. In some instances, the microphone port 130 may be aligned with the one or more microphone(s), or vice versa.

The electronic device 100 may also include openings that permit sound generated by the one or more loudspeaker(s) to disperse outward and away from the electronic device 100. In some instances, the openings may be disposed proximate to the bottom 110 of the electronic device 100 and/or on opposing sides of the electronic device 100, such as the first side 112 and the second side 114.

FIGS. 2A-2C illustrate the electronic device 100, and show various components of the electronic device 100 in dashed lines to illustrate their position and/or orientation within the electronic device 100. As discussed above, the electronic device 100 may include PIR sensors 200 disposed behind a first cover 122 of the electronic device 100. For example, the PIR sensors 200 may be disposed behind (Z-direction) the first cover 122. In some instances, the PIR sensors 200 may be disposed proximate to the front 104, the first side 112, and/or the second side 114 of the electronic device 100. Further, in some instances, the PIR sensors 200 may be horizontally distributed across the electronic device 100 (X-direction). In some instances, the PIR sensors 200 may be equally spaced apart across a width of the electronic device 100 (X-direction). Further, in some instances, the PIR sensors 200 may be horizontally aligned (X-direction).

In some instances, the electronic device 100 may include three PIR sensors 200, such as a first PIR sensor 200(1), a second PIR sensor 200(2), and/or a third PIR sensor 200(3). In some instances, the first PIR sensor 200(1) may be disposed at, or proximate to, a first corner 202 of the electronic device 100, between the front 104 and the first side 112. The second PIR sensor 200(2) may be disposed at, or proximate to, the front 104 of the electronic device 100. In some instances, the second PIR sensor 200(2) may be aligned with a longitudinal axis 204 of the electronic device 100 in the front view of FIG. 2B. The second PIR sensor 200(2) may therefore be centered (X-direction) on the electronic device 100, between the first side 112 and the second side 114. The third PIR sensor 200(3) may be disposed at, or proximate to, a second corner 206 of the electronic device 100, between the front 104 and the second side 114 of the electronic device 100.

However, in some instances, the electronic device 100 may include more than or less than three PIR sensors 200, and/or more than or less than three second cameras 210. For example, the electronic device 100 may include two PIR sensors 200 and/or two second cameras 210. In instances where the electronic device 100 includes less than three PIR sensors 200, and/or more than or less than three second cameras 210, the horizontal FOV and/or vertical FOV may be similar to examples that include three PIR sensors 200 and/or three second cameras 210. In other words, the electronic device 100 may have the same, or substantially the same, FOV with two PIR sensors 200 and/or two second cameras 210 as with three PIR sensors 200 and/or three second cameras 210, respectively. Moreover, some embodiments may include a single PIR sensor 200 and/or a single second camera 210. Accordingly, the electronic device 100 may include varying numbers of PIR sensors 200 and second cameras 210.

With reference to FIG. 1, the electronic device 100 may include one or more camera(s) disposed behind one or more covers of the electronic device 100, such as the second cover 124 and/or the third cover 126. With reference to FIGS. 2A-2C, in some instances, the electronic device 100 may include a first camera 208 and/or one or more second cameras 210, such as a second camera 210(1), a third camera 210(2), and a fourth camera 210(3). The first camera 208 may be disposed behind the second cover 124 (Z-direction), while the second cameras 210 may be disposed behind the third cover 126 (Z-direction). In some instances, the second cameras 210 may be horizontally distributed across the electronic device 100 and/or equally spaced apart across the width of the electronic device 100.

In some instances, the first camera 208 may be aligned with the longitudinal axis 204 in the front view of FIG. 2B, below the PIR sensors 200 (Y-direction). The first camera 208 may therefore be centered (X-direction) on the electronic device 100, between the first side 112 and the second side 114. The second camera 210(1) may be disposed at, or proximate to, the first corner 202, and the fourth camera 210(3) may be disposed at, or proximate to, the second corner 206. The third camera 210(2) may be disposed between (X-direction) the second camera 210(1) and the fourth camera 210(3). In some instances, the third camera 210(2) may be aligned with the longitudinal axis 204 of the electronic device 100 in the front view of FIG. 2B. Accordingly, in some instances, the second PIR sensor 200(2), the first camera 208, and/or the third camera 210(2) may be vertically aligned with one another (Y-direction). The first camera 208 may also be equally spaced, vertically (Y-direction), between the second PIR sensor 200(2) and the third camera 210(2).

As illustrated in FIGS. 2A-2C, the PIR sensors 200 may be arranged closer to the top 108 of the electronic device 100 than the first camera 208 and the second cameras 210. Further, in some instances, the second cameras 210 may be disposed closer to the bottom 110 of the electronic device 100 than the PIR sensors 200 and the first camera 208. Moreover, the first camera 208 may be located closer to the top 108 than the second cameras 210, and the first camera 208 may be located closer to the bottom 110 than the PIR sensors 200. Additionally, or alternatively, in some instances the second cameras 210 may be located between the PIR sensors 200 and the first camera 208 (Y-direction). That is, the second cameras 210 may be located vertically beneath the PIR sensors 210 (Y-direction) and vertically above the first camera 208 (Y-direction). Additionally, the electronic device may, in some instances, include more than or less than three PIR sensors 200 and/or second camera 210 as shown.

In some instances, the first camera 208 may include the first type of camera, while the second cameras 210 may each include the second type of camera. However, in other instances, each of the first camera 208, the second camera 210(1), the third camera 210(2), and/or the fourth camera 210(3) may include the first type of camera or the second type of camera.

In some instances, the first type of camera may include a high-resolution camera and the second type of camera may include a low-resolution camera, where resolution may refer to the pixel count of the camera's image sensor (e.g., number of total pixels, number of recorded pixels, number of effective pixels, etc.). As described above, a camera may be a high-resolution camera when the pixel count of the camera's image sensor is equal to or greater than a threshold pixel count. Additionally, a camera may be a low-resolution camera when the pixel count of the camera's image sensor is equal to or less than a threshold pixel count. The threshold pixel count may be, but is not limited to, 76,800 (e.g., 320×240 pixels), 172,800 pixels (e.g., 480×360 pixels), 307,200 pixels (e.g., 640×480 pixels), 921,600 pixels (e.g., 1280×720) 1,108,922 pixels (e.g., 1216×912 pixels), 3,763,200 pixels (e.g., 2240×1680 pixels), or any other pixel count.

In some instances, the first type of camera may consume larger amounts of power as compared to the second type of camera. For example, the first type of camera may consume tens of mW or hundreds of mW, while the second type of camera may consume single-digit amounts of mW.

Additionally, or alternatively, in some instances the first type of camera may include camera having a color image sensor (e.g., RGB or RGB-IR), while the second type of camera may include a camera having a monochromatic image sensor (e.g., black and white or grayscale).

In some instances, the second cameras 210 may include a Glance sensor manufactured by Qualcomm, Inc. of San Diego, Calif. The Glance sensor may include an integrated image sensor (e.g., metal-oxide semiconductor (CMOS) image sensor) and a low-power processor. In some instances, the second cameras 210 may include a resolution of 320×240 pixels. In some instances, the second cameras 210 may consume about 2 mW, or less than about 2 mW of power. In some instances, given that the second cameras 210, or the Glance sensors, may consume less power than the PIR sensors 200 and/or the first camera 208, the second cameras 210 may be in an "always on" state to record images within their respective FOVs.

FIGS. 3A-3C illustrate the electronic device 100 with the first cover 122, the second cover 124, and the third cover 126 removed to show the PIR sensors 200, the first camera 208, and the second cameras 210, respectively. As discussed in more detail below with respect to FIGS. 4 and 5, the electronic device 100 may include a frame 300 having one or more openings for accommodating or receiving the PIR sensors 200. The first cover 122 may secure to the frame 300 via fasteners (e.g., screws, snap-fits, tab-and-slot engagement, etc.), adhesives, pressure-fit, and/or any other type of attachment mechanism. In some instances, the first cover 122 may include first attachment members (e.g., hooks, tabs, etc.) that engage with corresponding attachment members on the frame 300 (e.g., slots, receivers, etc.).

The frame 300 may include a first slot 302 (or recess, or depression, or trough, or channel, etc.) for receiving the first cover 122. The first cover 122, when coupled to the frame 300, may reside or fit within the first slot 302. For example, as illustrated, the first slot 302 may be disposed inward (X- and Z-directions) from the exterior surface 116 of the electronic device 100. In some instances, the first slot 302 may extend across the front 104 of the electronic device 100, as well as along/into the first side 112 and the second side 114.

Disposed behind the second cover 124 is the first camera 208, which in some instances may be disposed vertically (Y-direction) beneath the second PIR sensor 200(2) and above the third camera 210(2). The second cover 124 may couple to the frame 300 via fasteners (e.g., screws, snap-fits, tab-and-slot engagement, etc.), adhesives, pressure-fit, and/ or any other type of attachment mechanism. In some instances, the second cover 124 may include first attachment members (e.g., hooks, tabs, etc.) that engage with corresponding attachment members on the frame 300 (e.g., slots, receivers, etc.). Additionally, the frame 300 may include a second slot 304 for receiving the second cover 124. Once coupled to the frame 300, the second cover 124 may reside or be disposed within the second slot 304.

Additionally, the frame 300 may include a third slot 306 for receiving the third cover 126. As shown, the third slot 306 may extend across the front 104 of the electronic device 100, as well as along/into the first side 112 and the second side 114. The third cover 126 may couple to the frame 300 via fasteners (e.g., screws, snap-fits, tab-and-slot engagement, etc.), adhesives, pressure-fit, and/or any other type of attachment mechanism. In some instances, the third cover 126 may include first attachment members (e.g., hooks, tabs, etc.) that engage with corresponding attachment members on the frame 300 (e.g., slots, receivers, etc.). In some instances, the second cameras 210 may reside within the third slot 306. Once coupled to the frame 300 (e.g., fasteners, adhesives, pressure-fit, etc.), the third cover 126 may reside within the third slot 306.

With reference to FIG. 1, exterior surfaces of the first cover 122, the second cover, 124, the third cover 126, and the fourth cover 128 may be flush with one another, and may comprise respective portions of the exterior surface 116 of the electronic device 100. That is, when the first cover 122, the second cover, 124, and/or the third cover 126 reside within the first slot 302, the second slot 304, and the third slot 306, respectively, the first cover 122, the second cover, 124, the third cover 126, and the fourth cover 128 may form at least a portion of the exterior surface 116 of the electronic device 100.

Figure 4A:
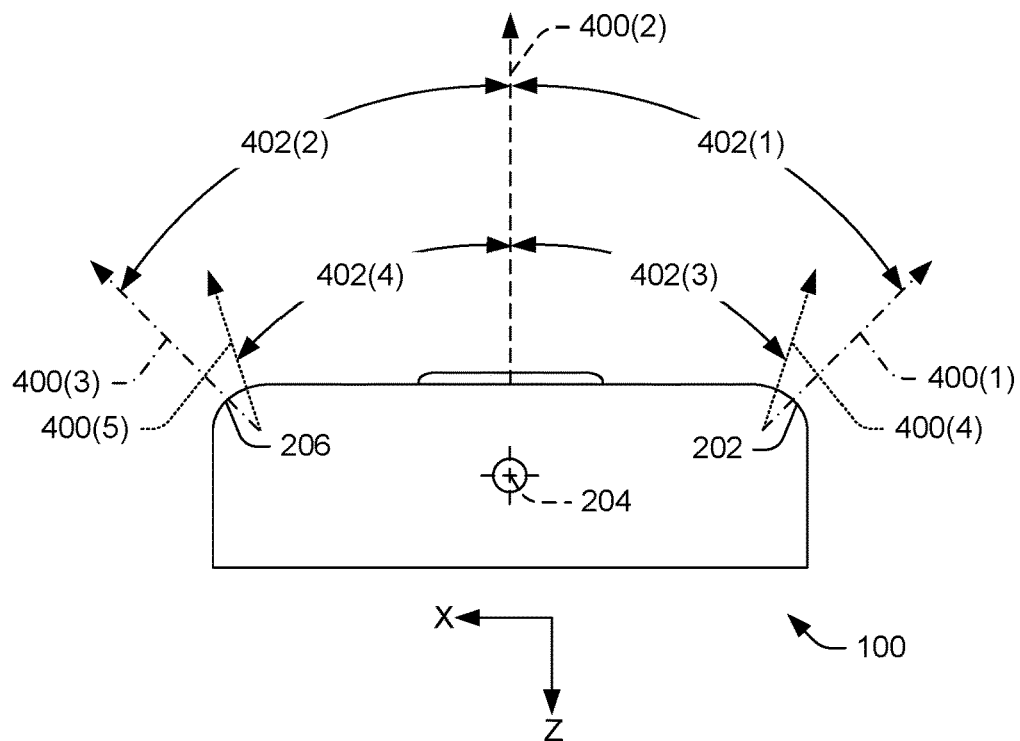
FIGS. 4A-4B illustrate views of the electronic device of FIG. 1, showing example fields-of-view of example components of the electronic device, according to aspects of the present disclosure.

FIG. 4A illustrates example orientations of the PIR sensors 200 and the cameras 208, 210 within the electronic device 100. With reference to FIGS. 2A-2C and 4A, the first PIR sensor 200(1) may be disposed at, or proximate to, the first corner 202 of the electronic device 100 and oriented in a first direction 400(1). In some instances, the first direction 400(1) may be disposed at an angle 402(1) relative to a second direction 400(2) that is perpendicular to the longitudinal axis 204 and parallel to the Z-axis. In some instances, the angle 402(1) may comprise 45 degrees, 50 degrees, 55 degrees, 60 degrees, or any other angle. The first direction 400(1) may be oriented orthogonal to a front surface of the first PIR sensor 200(1), and may bisect a horizontal FOV of the first PIR sensor 200(1). As such, the first PIR sensor 200(1) may be oriented to detect motion in front of and/or to the first side 112 of the electronic device 100.

The second PIR sensor 200(2) may be disposed along the longitudinal axis 204 (or another axis that is parallel to the longitudinal axis 204) so as to be horizontally centered on the electronic device 100. The second PIR sensor 200(2)

may be oriented in the second direction 400(2), which is perpendicular to the longitudinal axis 204 and parallel to the Z-axis. The second direction 400(2) may be oriented orthogonal to a front surface of the second PIR sensor 200(2), and may bisect a horizontal FOV of the second PIR sensor 200(2). As such, the second PIR sensor 200(2) may be oriented to detect motion in front of and/or to the sides of the electronic device 100.

The third PIR sensor 200(3) may be disposed at, or proximate to, the second corner 206 of the electronic device 100 and oriented in a third direction 400(3). In some instances, the third direction 400(3) may be disposed at an angle 402(2) relative to the second direction 400(2). In some instances, the angle 402(2) may be the same as or similar to the angle 402(1). The third direction 400(3) may be oriented orthogonal to a front surface of the third PIR sensor 200(3), and may bisect a horizontal FOV of the third PIR sensor 200(3). As such, the third PIR sensor 200(3) may be oriented to detect motion in front of and/or to the second side 114 of the electronic device 100.

As the first PIR sensor 200(1) and the third PIR sensor 200(3) are angled or oriented away from the second direction 400(2), the first PIR sensor 200(1) and the third PIR sensor 200(3) may expand a collective horizontal FOV of the PIR sensors 200. For example, each of the PIR sensors 200 may include a respective horizontal FOV, and in some instances the horizontal FOVs of the PIR sensors 200 may overlap. For example, the horizontal FOV of the second PIR sensor 200(2) may overlap the horizontal FOV of the first PIR sensor 200(1) by between 10 degrees and 20 degrees, and may overlap the horizontal FOV of the third PIR sensor 200(3) by between 10 degrees and 20 degrees. The PIR sensors 200 may thus provide a collective horizontal FOV of approximately or substantially between 160 degrees and 180 degrees, such as about 170 degrees. In some examples, a vertical FOV of the PIR sensors 200 may be between 30 degrees and 60 degrees, such as about 45 degrees. However, in other examples, the horizontal FOV and/or the vertical FOV of the PIR sensors 200 may include any other angle.

The first camera 208 may be disposed along the longitudinal axis 204 (or another axis that is parallel to the longitudinal axis 204) so as to be horizontally centered on the electronic device 100. The first camera 208 may be oriented such that the axis of the lens of the first camera 208 is parallel to, or coincident with, the second direction 400(2), which is perpendicular to the longitudinal axis 204 and parallel to the Z-axis. As such, in some instances, the first camera 208 may be oriented to record images and/or videos in front of and/or to the sides of the electronic device 100. In some examples, the first camera 208 may include a horizontal FOV of approximately or substantially between 150 degrees and 180 degrees, such as about 165 degrees, and/or a vertical FOV of approximately or substantially between 50 degrees and 80 degrees, such as about 65 degrees. In other examples, the first camera 208 may include a horizontal FOV and/or vertical FOV that includes any other angle.

The second camera 210(1) may be disposed at, or proximate to, the first corner 202 of the electronic device 100 and oriented in a fourth direction 400(4). In some instances, the fourth direction 400(4) may be disposed at an angle 402(3) relative to the second direction 400(2). In some instances, the angle 402(3) may include angles such as 30 degrees, 35 degrees, 40 degrees, 45 degrees, and/or any other angle. The fourth direction 400(4) may be parallel to, or coincident with, an axis of a lens of the second camera 210(1), and may bisect a horizontal FOV of the second camera 210(1). As such, the second camera 210(1) may be oriented to record images/video in front of and/or to the first side 112 of the electronic device 100.

The third camera 210(2) may be disposed along the longitudinal axis 204 (or another axis that is parallel to the longitudinal axis 204) so as to be horizontally centered on the electronic device 100. The third camera 210(2) may be oriented such that the axis of the lens of the third camera 210(2) is parallel to, or coincident with, the second direction 400(2), which is perpendicular to the longitudinal axis 204 and parallel to the Z-axis. As such, in some instances, the third camera 210(2) may be oriented to record images/video in front of and/or to the sides the electronic device 100.

The fourth camera 210(3) may be disposed at, or proximate to, the second corner 206 of the electronic device 100 and oriented in a fifth direction 400(5). In some instances, the fifth direction 400(5) may be disposed at an angle 402(4) relative to the second direction 400(2). In some instances, the angle 402(4) may be the same as or similar to the angle 402(3). The fifth direction 400(5) may be parallel to, or coincident with, an axis of a lens of the fourth camera 210(3), and may bisect a horizontal FOV of the fourth camera 210(3). As such, the fourth camera 210(3) may be oriented to record images/video in front of and/or to the second side 114 of the electronic device 100.

As the second camera 210(1) and the fourth camera 210(3) are angled or oriented away from the second direction 400(2), the second camera 210(1) and the fourth camera 210(3) may expand a collective horizontal FOV of the second cameras 210. For example, each of the second cameras 210 may include a respective horizontal FOV, and in some instances the horizontal FOVs of the second cameras 210 may overlap. For example, the horizontal FOV of the third camera 210(2) may overlap the horizontal FOV of the second camera 210(1) by between 10 degrees and 20 degrees, and may overlap the horizontal FOV of the fourth camera 210(3) by between 10 degrees and 20 degrees. The image data and/or video data recorded by the second cameras 210 may be stitched together or otherwise combined to produce a collective FOV for the second cameras 210, and in some examples the horizontal FOV of the second cameras 210 may be approximately or substantially between 150 degrees and 180 degrees, such as about 165 degrees. In some examples, a vertical FOV of the second cameras 210 may be approximately or substantially between 35 degrees and 65 degrees, such as about 50 degrees. However, in other examples, the horizontal FOV and/or the vertical FOV of the second cameras 210 may include any other angle.

In some instances, the horizontal FOV and/or the vertical FOV of the PIR sensors 200 may be greater than the horizontal FOV and/or the vertical FOV of the first camera 208 and/or the second cameras 210. That is, in some instances, the angle 402(3) and the angle 402(4) may be smaller than the angle 402(1) and the angle 402(2), respectively.

Although FIG. 4A illustrates that the first direction 400(1) is not aligned with the fourth direction 400(4), and the third direction 400(3) is not aligned with the fifth direction 400(5), in some embodiments the first direction 400(1) may be aligned with the fourth direction 400(4), and/or the third direction 400(3) may be aligned with the fifth direction 400(5). In such embodiments, the first PIR sensor 200(1) would be aligned with the second camera 210(1), and/or the third PIR sensor 200(3) would be aligned with the fourth camera 210(3).

Furthermore, although FIG. 4A illustrates a particular arrangement of the PIR sensors 200 and/or the second cameras 210, the electronic device 100 may include different arrangements. For example, in some instances, the electronic device 100 may include the first camera 208 and two second cameras, such as the second camera 210(1) and the fourth camera 210(3). In such instances, the second camera 210(1) and the fourth camera 210(3) may be horizontally aligned with the first camera 208. For example, the second camera 210(1) and the fourth camera 210(3) may be disposed at the first corner 202 and the second corner 206, respectively, but may be horizontally aligned with the first camera 208 (e.g., the cameras may all lie along a line extending in the X-direction). In some embodiments having only the second camera 210(1) and the fourth camera 210(3), an axis (the imaginary line through the optical center of the lens perpendicular to the photo plane) of the second camera 210(1) may intersect with an axis of the fourth camera 210(3) at a point in front of the first camera 208. Also in some embodiments having only the second camera 210(1) and the fourth camera 210(3), the second camera 210(1) and the fourth camera 210(3) may each have a horizontal FOV such that the cumulative horizontal FOV of the two second cameras 210 is the same as, or substantially the same as, the cumulative horizontal FOV of embodiments that include the second camera 210(1), the third camera 210(2), and the fourth camera 210(3). In still further embodiments, the electronic device 100 may include more than three second cameras 210, such as, four, five, six, or any other number of second cameras 210.

Figure 4B:
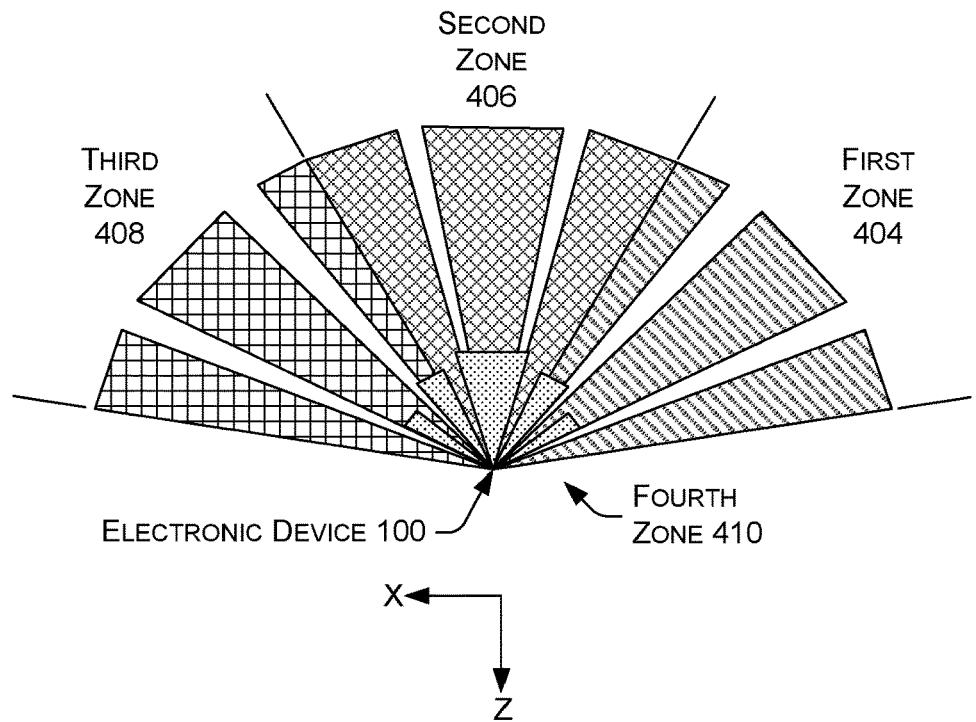

FIG. 4B is a top plan view illustrating example horizontal motion detection zones of the PIR sensors 200 of the electronic device 100 may detect motion. In some instances, the electronic device 100 may be configured to detect motion within different zones in front of and/or to the side(s) of the electronic device 100. Each of the PIR sensors 200 may be configured to detect a different region, or portion, of the zones as shown in FIG. 4B. Additionally, in some instances, the PIR sensors 200 may detect overlapping portions of the zones.

For example, as shown in FIG. 4B, the first PIR sensor 200(1) may detect motion within a first zone 404, the second PIR sensor 200(2) may detect motion within a second zone 406, and the third PIR sensor 200(3) may detect motion within a third zone 408. In some instances, based on the placement of the electronic device 100 on a structure, the electronic device 100 may be configured to detect motion within at least one of the first zone 404, the second zone 406, and/or the third zone 408. For example, if an exterior wall is within the third zone 408 (or the third PIR sensor 200(3) is orientated towards the wall), a user may disable capturing motion within the third zone 200(3) and instead, may configure the electronic device to detect motion in the first zone 404 and/or the second zone 406. By way of another example, if the user desires to only detect motion within the second zone 406, or in front of the electronic device 100, the user may disable the first PIR sensor 200(1) and the third PIR sensor 200(3) such that motion is not detected within the first zone 404 and the third zone 408 respectively.

In some instances, the first zone 404, the second zone 406, and/or the third zone 408 may detect motion up to, or within, approximately or substantially 25 feet from the electronic device 100. However, in other instances, the first zone 404, the second zone 406, and/or the third zone 408 may detect motion farther than 25 feet from the electronic device 100. Furthermore, and in some instances, the first zone 404, the second zone 406, and/or the third zone 408 may provide a collective horizontal FOV of between approximately 160 degrees and approximately 180 degrees.

Additionally, in some instances, the first zone 404, the second zone 406, and/or the third zone 408 may individually include a horizontal FOV of approximately 45 degrees, 50 degrees, 55 degrees, 60 degrees, or any other angle. Collectively, therefore, the first zone 404, the second zone 406, and the third zone 408 may have a horizontal FOV of between approximately 135 degrees and approximately 180 degrees. However, the first zone 404, the second zone 406, and the third zone 408 may have other horizontal FOV angles. Additionally, in some instances, the electronic device 100 may include a lens (e.g., a Fresnel lens) that limits the range of the second PIR sensor 200(2) to an area close to the front of the electronic device 100 as indicated by the fourth zone 410. In some instances, the fourth zone 410 may detect motion up to approximately 10 feet from the electronic device 100, and, in some instances, the fourth zone 410 may provide a horizontal FOV of between approximately 110 degrees and approximately 120 degrees.

FIG. 4C is a side view illustrating example vertical motion detection zones of the PIR sensors 200 of the electronic device 100. The electronic device 100 may be mounted on a structure 412 at a height H above the ground 414. The first zone 404, the second zone 406, and/or the third zone 408 may extend between a distance $D_1$ and a distance $D_2$ as measured from the structure 412, while the fourth zone 410 may extend between a distance $D_3$ and a distance $D_4$ from the structure 412. In some instances, the distance $D_1$ may be approximately 22 feet, while the distance $D_2$ may be approximately 25 feet, while the distance $D_3$ may be approximately 7 feet, while the distance $D_4$ may be approximately 10 feet. Advantageously, however, the distances $D_1$, $D_2$, $D_3$, $D_4$ may be increased or decreased based on the mounting height H. For example, by mounting the electronic device 100 higher on the structure 412 (e.g., increasing the height H) each of the distances $D_1$, $D_2$, $D_3$, $D_4$ may increase, and by mounting the electronic device 100 lower on the structure 412 (e.g., decreasing the height H), each of the distances $D_1$, $D_2$, $D_3$, $D_4$ may decrease. Accordingly, the user may choose a mounting height H for the electronic device 100 based on a desired configuration for the first zone 404, the second zone 406, the third zone 408, and the fourth zone 410 of the PIR sensors 200.

FIG. 5 illustrates a mount 500 for receiving the PIR sensors 200, the first camera 208, and/or the second cameras 210 of the electronic device 100. In some instances, the mount 500 may include features to secure the PIR sensors 200, the first camera 208, and/or the second cameras 210, and/or to orient these components in desired directions. In some instances, the PIR sensors 200, the first camera 208, and/or the second cameras 210 may couple to the mount 500 via adhesives, pressure-fit, fasteners, combinations thereof, and/or via other techniques.

The mount 500 may include first apertures 502 for receiving the PIR sensors 200. For example, the mount 500 may include a first aperture 502(1) for receiving the first PIR sensor 200(1), a second aperture 502(2) for receiving the second PIR sensor 200(2), and/or a third aperture 502(3) for receiving the third PIR sensor 200(3). When the PIR sensors 200 are coupled to the mount 500, the PIR sensors 200 may be disposed within, or at least partially within, respective ones of the first apertures 502. The shape of the mount 500 orients the PIR sensors 200 in their respective directions, as discussed above with respect to FIGS. 4A-4C.

The mount 500 may further include a second aperture 504 for receiving the first camera 208. The first camera 208 may be disposed within, or at least partially within, the second aperture 504. The shape of the mount 500 orients the first camera 208 in the second direction.

The mount 500 may include third apertures 506 for receiving the second cameras 210. For example, the third apertures 506 may include a first aperture 506(1) for receiving the second camera 210(1), a second aperture 506(2) for receiving the third camera 210(2), and a third aperture 506(3) for receiving the fourth camera 210(3). When the second cameras 210 are coupled to the mount 500, the second cameras 210 may be disposed within, or at least partially within, the third apertures 506, respectively. The shape of the mount 500 orients the second cameras 210 in their respective directions.

Figure 6:
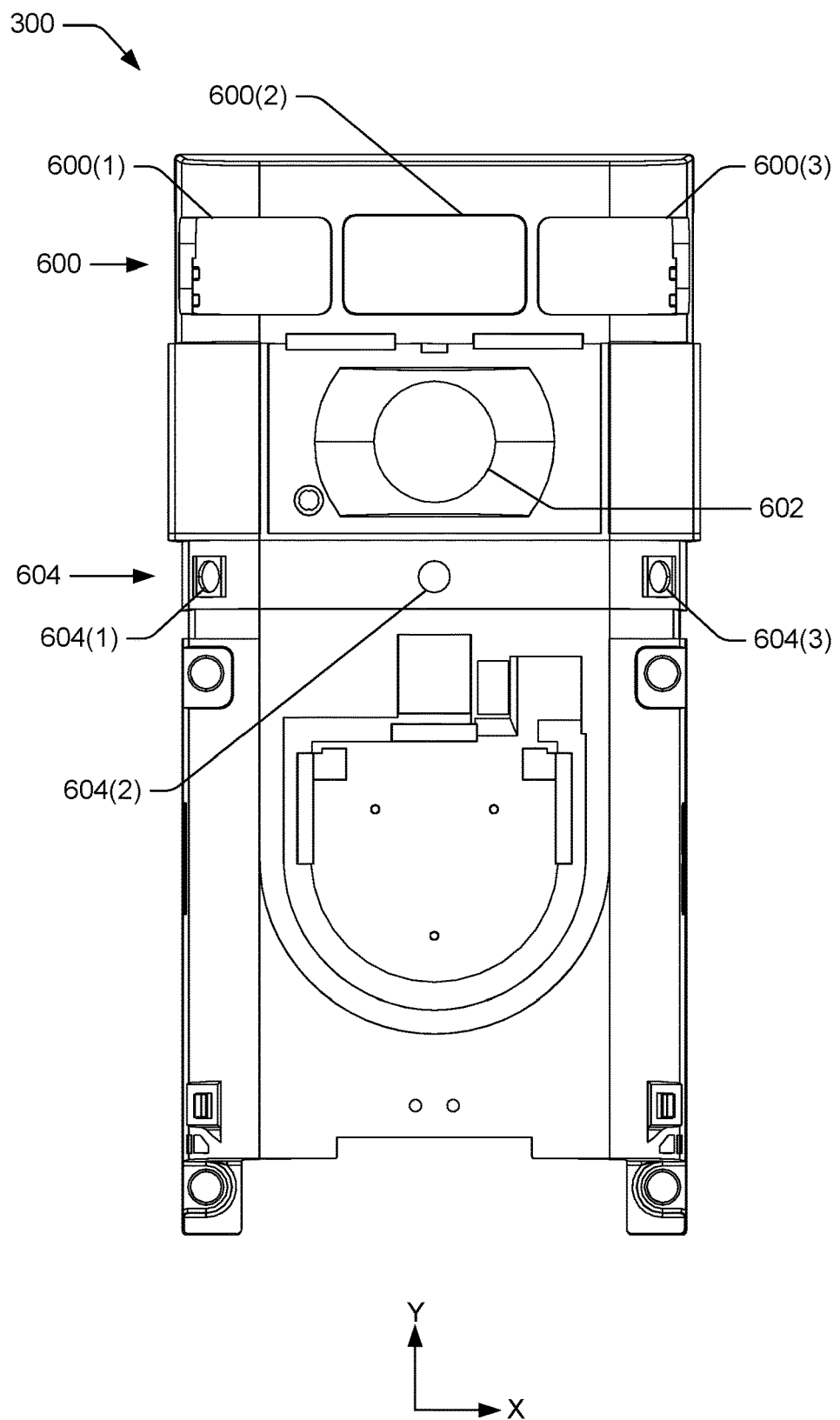
FIG. 6 illustrates a front view of an example frame of the electronic device of FIG. 1, according to an aspect of the present disclosure.
Figure 7A:
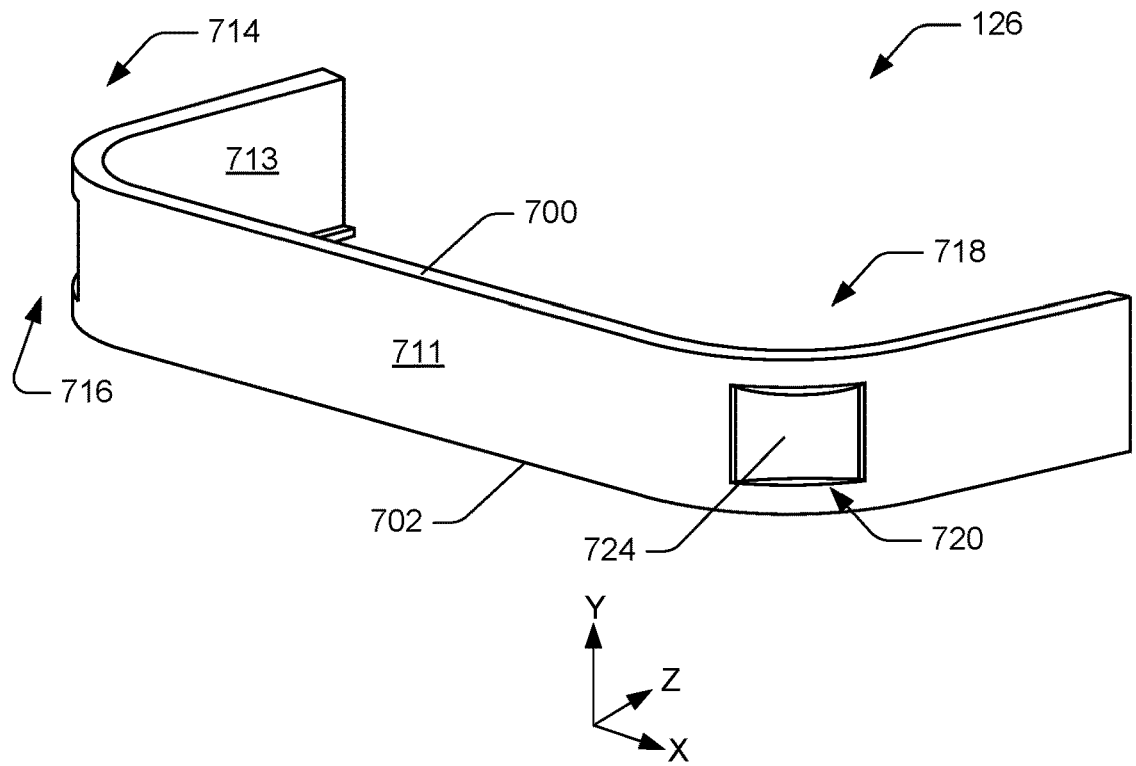
FIG. 7A illustrates a perspective view of an example cover of the electronic device of FIG. 1, according to an aspect of the present disclosure.
Figure 7B:
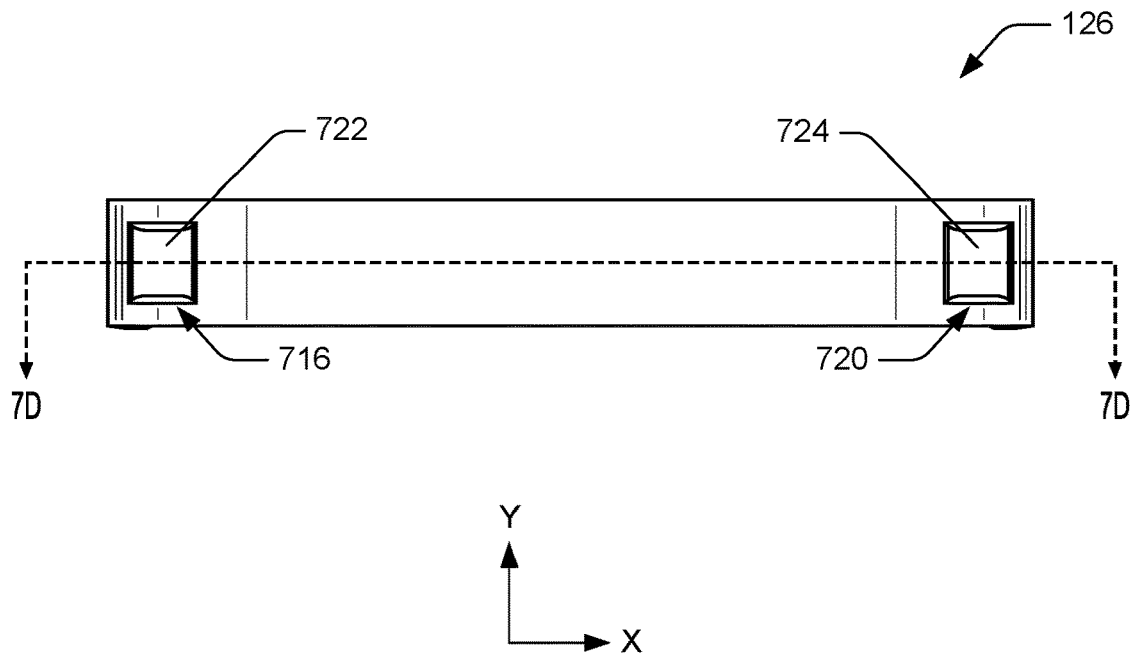
FIG. 7B illustrates a front view of the cover of FIG. 7A, according to an aspect of the present disclosure.
Figure 7C:
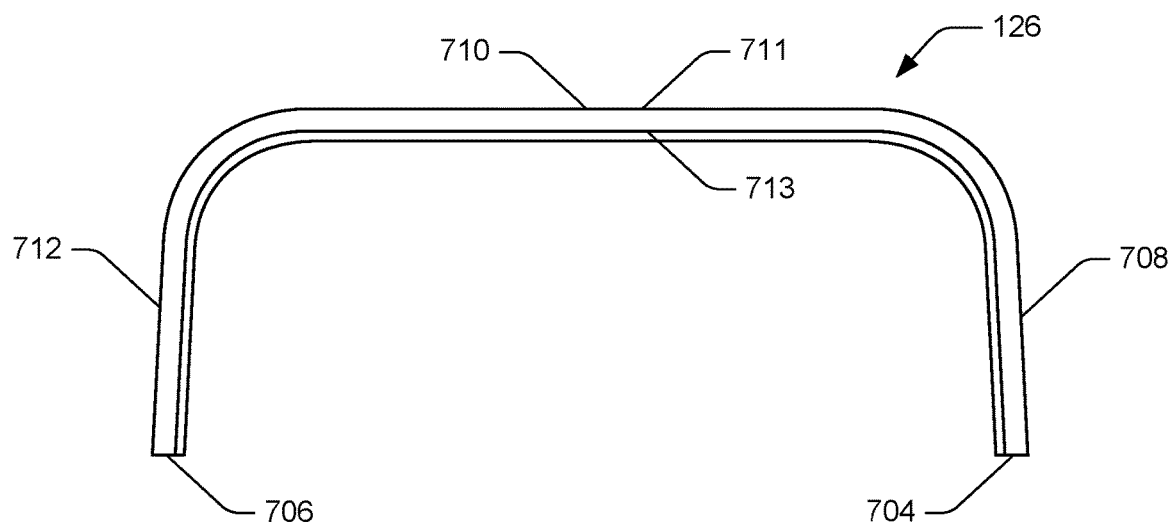
FIG. 7C illustrates a top view of the cover of FIG. 7A, according to an aspect of the present disclosure.
Figure 7D:
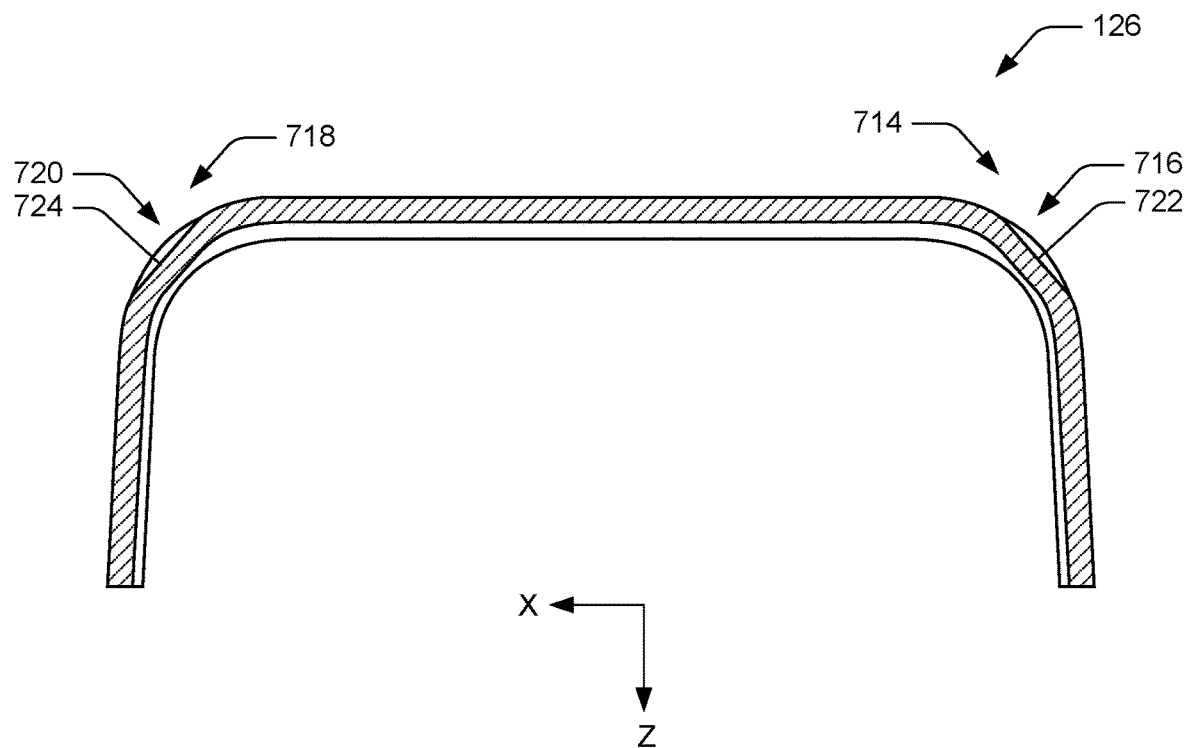
FIG. 7D illustrates a cross-sectional view of the cover of FIG. 7A, taken along line 7D-7D of FIG. 7B, according to an aspect of the present disclosure.

FIG. 6 illustrates the frame 300 to which components of the electronic device 100 may couple. For example, in some instances, the PIR sensors 200, the first camera 208, and/or the second cameras 210 may couple to the mount 500, and the mount 500 may couple to the frame 300. In some instances, the PIR sensors 200, the first camera 208, and the second cameras 210 may be coupled directly to the frame 300 and the mount 500 may be omitted. In some instances, the frame 300 and the mount 500 may include respective or corresponding features to align or position the frame 300 and the mount 500. For example, the frame 300 may include first alignment elements (e.g., pins, holes, extrusions, depressions, tabs, slots, etc.) that engage or align with second alignment elements on the mount 500 (e.g., pins, holes, extrusions, depressions, tabs, slots, etc.). Additionally, or alternatively, in some instances, the mount 500 may couple to the frame 300 via fasteners (e.g., screws, snap-fits, tab-and-slot engagement, etc.), adhesives, pressure-fit, and/or any other type of attachment mechanism. In some instances, the mount 500 may include attachment members (e.g., hooks, tabs, etc.) that engage with corresponding attachment members on the frame 300 (e.g., slots, receivers, etc.).

FIG. 6 illustrates the frame 300 having openings for accommodating the PIR sensors 200, the first camera 208, and/or the second cameras 210, such that the frame 300 does not obstruct the respective FOVs of the PIR sensors 200, the first camera 208, and/or the second cameras 210. For example, the frame 300 may include first openings 600 for the PIR sensors 200, a second opening 602 for the first camera 208, and third openings 604 for the second cameras 210. The openings 600, 602, 604 may align with respective ones of the apertures 502, 504, 506 in the mount 500, and respective ones of the PIR sensors 200 and the cameras 208, 210, when the frame 300 and the mount 500 are secured to one another as shown in FIGS. 3A-3C. For example, the first openings 600 may include a first opening 600(1) aligned with the first aperture 502(1) and the first PIR sensor 200(1), a second opening 600(2) aligned with the second aperture 502(2) and the second PIR sensor 200(2), and a third opening 600(3) aligned with the third aperture 502(3) and the third PIR sensor 200(3). The second opening 602 is aligned with the second aperture 504 and the first camera 208, and the first camera 208 may extend into or at least partially through the second opening 602. The third openings 604 may include a first opening 604(1) aligned with the first aperture 506(1) and the second camera 210(1), a second opening 604(2) aligned with the second aperture 506(2) and the third camera 210(2), and a third opening 604(3) aligned with the third aperture 506(3) and the fourth camera 210(3). The second cameras 210 may extend into, or at least partially through, respective ones of the third openings 604.

FIG. 7A-7D illustrate the third cover 126, which may be disposed in front of the second camera 210(1), the third camera 210(2), and/or the fourth camera 210(3). In some instances, the third cover 126 may include a top 700, a bottom 702, a first end 704, and/or a second end 706. Additionally, the third cover 126 may include a first side 708, a second side 710, a third side 712, an outer surface 711, and/or an inner surface 713. As shown, the third cover 126 may generally include a U-shaped design configured to reside within the third slot 306. That is, when the third cover 126 couples to the frame 300, the top 700, the bottom 702, the first end 704, the second end 706, and the bottom 702 of the third cover 126 may reside within the third slot 306.

The third cover 126 may include features, such as cutouts, recesses, notches, depressions, indentations and/or other features. In some instances, the depressions may be disposed at, or proximal to, corners of the third cover 126. For example, the third cover 126 may include a first corner 714 having a first recess 716 in the outer surface 711 and a second corner 718 having a second recess 720 in the outer surface 711. In some instances, the first recess 716 and/or the second recess 720 may provide flat surfaces 722, 724 at the corners 714, 718, respectively, in the outer surface 711 of the third cover 126. The inner surface 713 of the third cover 126 may also be flat at the corners 714, 718. The flat surfaces 711, 713 at the corners 714, 718 may represent panels, panes, or windows 722, 724 behind which the second camera 210(1) and the fourth camera 210(3), respectively, are disposed, and the flat surfaces of the windows 722, 724 may enable the second camera 210(1) and the fourth camera 210(3) to record images without distortion that might otherwise be caused by the curved portions of the third cover 126 at the corners 714, 718.

For example, a first window 722 may be located at, or proximate to, the first corner 714 of the third cover 126 and a second window 724 may be located at, or proximate to the second corner 718 of the third cover 126. When coupled to the frame 300, the first window 722 and the second window 724 may be disposed over, or within a FOV, of the second camera 210(1) and/or the fourth camera 210(3), respectively, so as to limit distortion in images and/or videos recorded by the cameras 210(1), 210(3) that might otherwise be caused by the curved portions of the third cover 126 at the corners 714, 718. In some instances, the first window 722 and the second window 724 may have a thickness between approximately 0.1 mm and approximately 2 mm, such as approximately 1 mm.

In some instances, the first window 722 and the second window 724 may be oriented orthogonal to respective axes of the lenses of the second camera 210(1) and the fourth camera 210(3). In some instances, the first window 722 and the second window 724 may be oriented perpendicularly to the fourth direction 400(4) and the fifth direction 400(5), respectively.

In some instances, the third cover 126 may not include a cutout, recess, notch, depression, indentation, etc. in the area that lies in front of the third camera 210(2). Instead, because this area of the third cover 126 is flat, it does not create image distortion for the third camera 210(2).

Figures 8A, 8B:
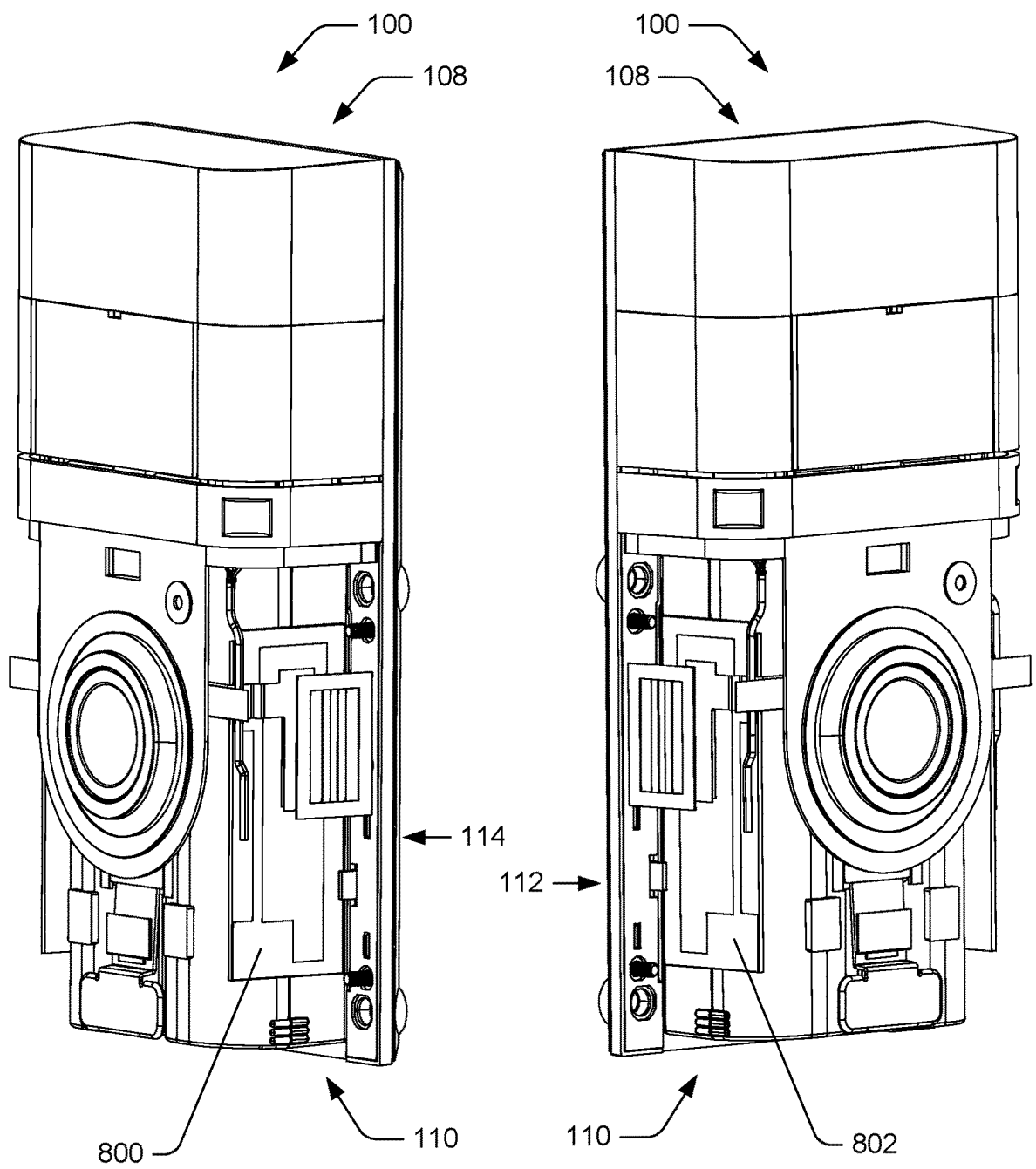
FIG. 8A illustrates a first side view of the electronic device of FIG. 1, with the front cover removed to show example components of the electronic device, according to an aspect of the present disclosure.
FIG. 8B illustrates a second side view of the electronic device of FIG. 1, with the front cover removed to show example components of the electronic device, according to an aspect of the present disclosure.

FIGS. 8A and 8B illustrate the fourth cover 128 removed from the electronic device 100 to show components residing behind the fourth cover 128. For example, the electronic device 100 may include one or more network interfaces for communicatively coupling the electronic device 100 to other computing devices (e.g., mobile phone, laptop, tablet, etc.). The network interface(s) may comprise one or more antenna(s). In some instances, the electronic device 100 may include a first antenna 800 and/or a second antenna 802. As discussed herein, the electronic device 100 may use the first antenna 800 and/or the second antenna 802 to communicate over a first network with one or more network devices, such as a server and a client device. In some examples, the first network may include a wireless local area network, such as, but not limited to, the Internet, a local intranet, a PAN, a LAN, a WAN, and/or the like. The electronic device 100 may further use the first antenna 800 and/or the second antenna 802 to communicate over a second network with local network devices, such as a hub of a home security/automation system, an automation device, and/or other electronic devices. In some examples, the second network may include a LPWAN, such as, but not limited to, a LoRaWAN, an Ultra Narrow Band modulation technology network (e.g., Sigfox, Telensa, NB-IoT, etc.), a sub-gigahertz network, and/or the like.

In some instances, the first antenna 800 and the second antenna 802 may be located on opposite sides of the electronic device 100, such as the first side 112 and the second side 114. For example, the first antenna 800 may be disposed behind the fourth cover 128 at the first side 112, while the second antenna 802 may be disposed behind the fourth cover 128 at the second side 114. In some instances, the first antenna 800 and/or the second antenna 802 may couple to the frame 300.

As shown, the first antenna 800 and/or the second antenna 802 may be disposed proximate to the bottom 110 of the electronic device 100. Locating the PIR sensors 200 proximate to the top 108 and locating the antennas 800, 802 proximate to the bottom 110 may reduce thermal inference and/or RF interference between the PIR sensors 200 and the antennas 800, 802. For example, heat generated by the antennas 800, 802 may negatively impact a performance or quality of sensing by the PIR sensors 200, because the heat may trigger the PIR sensors 200 to produce an output indicative of motion in the FOV even when no motion is happening (a "false positive" motion detection). Further, electromagnetic energy generated by the PIR sensors 200 may interfere with the ability of the antennas 800, 802 to send and receive RF signals. It is thus advantageous to increase the spacing between the PIR sensors 200 and the antennas 800, 802. The present embodiments increase this spacing by locating the PIR sensors 200 proximate to the top 108 of the electronic device 100 and locating the antennas 800, 802 proximate to the bottom 110 of the electronic device 100. In various embodiments, the spacing between the PIR sensors 200 and the antennas 800 as measured in the Y-direction may be at least 1.5", or at least 1.75", or at least 2", or at least 2.25", or at least 2.5", or at least 2.75", or at least 3", at least 3.25", at least 3.5", or any other distance.

Figure 9:
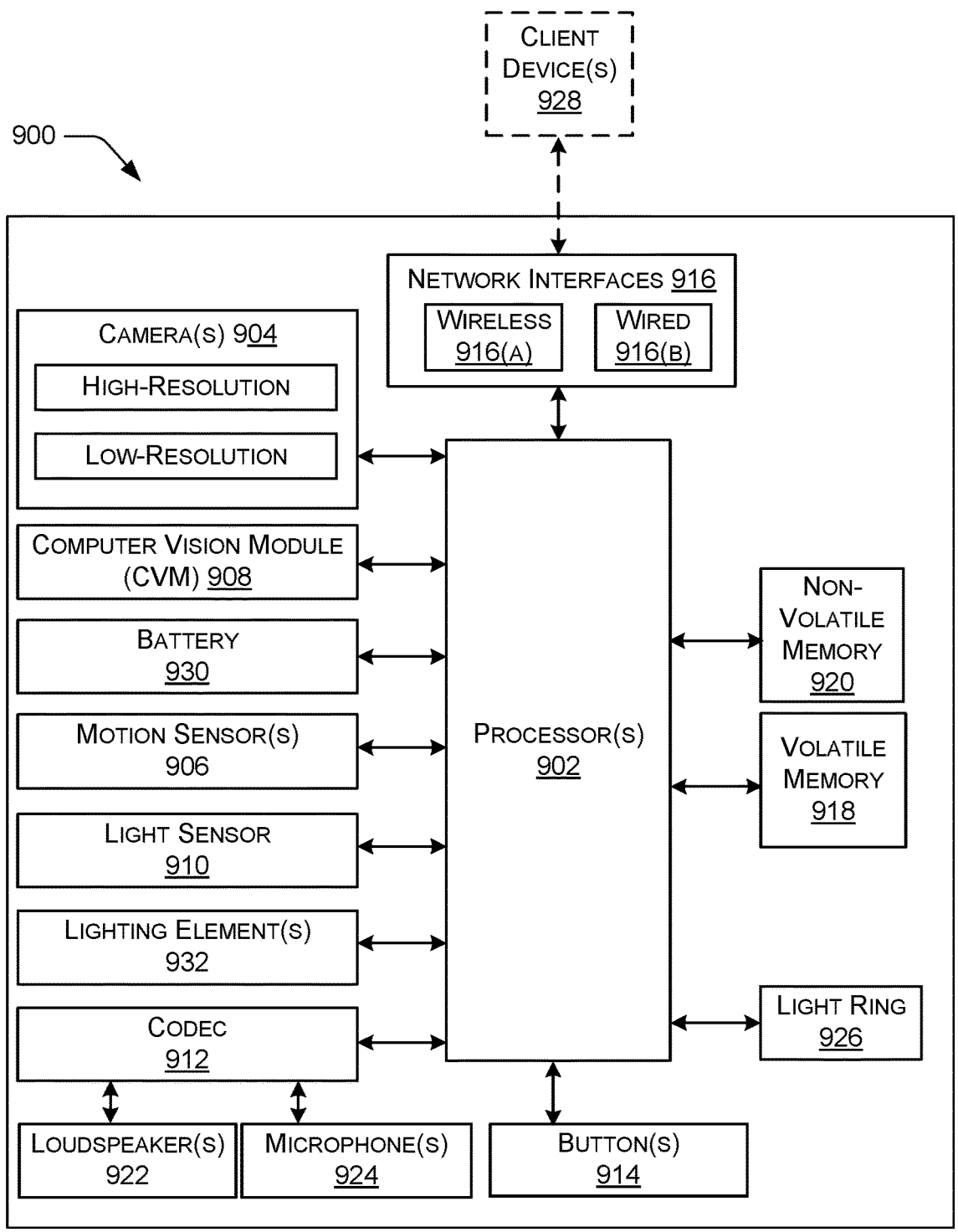
FIG. 9 illustrates example components of the electronic device of FIG. 1, according to an aspect of the present disclosure.

FIG. 9 illustrates a component diagram on an example electronic device 900, such as the electronic device 100, according to various aspects of the present disclosure. In some instances, the electronic device 100 may include a processor(s) 902, camera(s) 904, motion sensor(s) 906, a computer vision module 908, a light sensor 910, a Codec (coder-decoder) 912, button(s) 914, network interface(s) 916, volatile memory 918, non-volatile memory 920, loudspeaker(s) 922, and/or microphone(s) 924.

The processor(s) 902 (alternatively referred to herein as a "CPU," a "controller," and/or a "microcontroller") may comprise an integrated circuit including a processor core, memory, and programmable input/output peripherals. The processor(s) 902 may receive input signals, such as data, from the camera(s) 904, the motion sensor(s) 906, the light sensor 910, the loudspeaker(s) 922, the microphone(s) 924, and/or the network interface(s) 916 to perform various functions. In various instances, when the processor(s) 902 is triggered by the camera(s) 904, the motion sensor(s) 906, the button(s) 914, the network interface(s) 916, the loudspeaker(s) 922, the microphone(s) 924, and/or other components, the processor(s) 902 may perform one or more processes and/or functions. The processor(s) 902 may also provide data communication between various components such as between the network interface(s) 916 and the camera(s) 904.

As discussed above, the electronic device 900 may include first types of cameras 904(1) and/or second types of cameras 904(2). For example, the camera(s) 904 may include the first camera 208 and the second cameras 210. In some instances, the camera(s) 904 may include separate camera processor(s) or the processor(s) 902 may perform the camera processing functionality. The processor(s) 902 (and/or the camera processor(s)) may process video recorded by the camera(s) 904 and may transform this data into a form suitable for transfer by the network interface(s) 916. In some examples, the camera(s) 904 may be used for iris recognition and/or facial recognition of users within a FOV of the camera(s) 904. In some examples, the camera(s) 904 may also include a retinal scanner for performing retinal scans of users within the FOV.

The electronic device 900 include(s) one or more motion sensor(s) 906. In some instances, the motion sensor(s) 906 may be PIR sensors (e.g., the PIR sensors 200). The motion sensor(s) 906 may be any type of sensor capable of detecting and communicating the presence of an entity within their FOV. As such, the motion sensor(s) 906 may include one or more (alone or in combination) different types of motion sensors, such as acoustic, ultrasonic, microwave, tomographic, radar, and/or combinations thereof. For example, in some embodiments, the motion sensor(s) 906 may comprise PIR sensors, which may be secured on or within a PIR sensor holder that may reside behind a lens (e.g., a Fresnel lens) and/or cover(s) of the electronic device 900 (e.g., the first cover 122). In such examples, the PIR sensors may detect IR radiation in a FOV, and produce an output signal (e.g., voltage) that changes as the amount of IR radiation in the FOV changes. The amount of voltage in the output signal may be compared, by the processor(s) 902, for example, to one or more threshold voltage values to determine if the amount of voltage in the output signal is indicative of motion, and/or if the amount of voltage in the output signal is indicative of motion of an entity that is to be recorded by the camera(s) 904. In some instances, the motion sensor(s) 906 may detect the motion for activating the camera(s) 904 and/or the microphone(s) 924 to begin recording image data and/or audio data, respectively.

Although the discussion herein primarily relates to PIR sensors, depending on the embodiment, the motion sensor(s) 906 may include additional and/or alternate sensor types that produce output signals including alternative data types. For example, and without limitation, the output signal may include an amount of voltage change based on the presence of infrared radiation in a FOV of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 906 of the electronic device 900.

The electronic device may include computer vision module(s) (CVM) 908 may be as the motion sensor(s) 906, in addition to, or alternatively from, other motion sensor(s) 906. For example, the CVM 908 may be a low-power CVM that, by operating at low power (e.g., less than 2 mW of end-to-end power), is capable of providing computer vision capabilities and functionality for battery powered devices. The low-power CVM may include a lens, a CMOS image sensor, and a digital processor that may perform embedded processing within the low-power CVM itself, such that the low-power CVM may output post-processed computer vision metadata to the processor(s) 902. As such, the low-power CVM may be considered to be one or more of the motion sensor(s) 906, and the data type output in the output signal may be the post-processed computer vision metadata. The metadata may include information such as the presence of a particular type of entity (e.g., person, animal, vehicle, parcel, etc.), a direction of movement of the entity, a distance of the entity from the electronic device 900, etc. As a result of including the CVM 908, some aspects of the present embodiments may leverage the CVM 908 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. One aspect of computer vision comprises determining whether or not the image data contains some specific object, feature, or activity. Different varieties of computer vision recognition include, without limitation, object recognition (e.g., pre-specified or learned objects or object classes can be recognized, usually together with their 2D positions in the image or 3D poses), identification (e.g., individual instance of an object is recognized, such as a user's face or fingerprint, identification of handwritten digits, or identification of a specific vehicle), detection (e.g., image data is scanned for a specific condition). Additionally, several specialized tasks based on computer vision recognition exist, such as optical character recognition (OCR) (e.g., identifying characters in images of printed or handwritten text, usually with a view to encoding the text in a format more amenable to editing or indexing (e.g., ASCII), 2D Code Reading (e.g., reading of 2D codes such as data matrix and QR codes), facial recognition, and/or shape recognition technology (SRT) (e.g., differentiating human beings such as head and shoulder patterns from objects).

In some instances, face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

The button(s) 914 may include any touch surface capable of detecting and receiving touch input(s). In some instances, the button(s) 914 may be similar to, or the same as, the button 118. For example, the button(s) 914 may include a capacitive touch sensor, a resistive touch sensor, a mechanical switch, sensor pads, track pads, surface acoustic waves (SAW), an IR sensor, an optical imaging sensor, an acoustic pulse recognition sensor, a sensor that implements a low-power CVM for the detection of a person (e.g., a finger, hand, etc.,), or any other type of button/sensor capable of receiving touch input. When embodied as a capacitive touch sensor, the button(s) 914 may include a dielectric layer disposed between electrodes of the capacitive touch sensor such that the dielectric layer senses when force (e.g., touch input) is applied to the button(s) 914. Depending on the implementation, the dielectric layer may include deformable or non-deformable dielectric materials. For example, the capacitive touch sensor may operate by detecting changes in capacitance between the electrodes due to the deforming of the deformable dielectric layer as the distance between the electrodes vary. The electrodes of the two layers may be arranged to intersect in the plane of the capacitive touch sensor (e.g., the layers of electrodes may be situated such that the electrodes of the layers are parallel within the individual layers but not parallel to electrodes in the other layer). The dielectric layer between the layers of electrodes provides a vertical separation to prevent contact between electrodes of the different layers. Accordingly, each application of touch input on the button(s) 914 may create a contact point on the capacitive touch sensor. In some examples, the contact point may be characterized by the location of the contact point on the button(s) 914 (or the touch surface(s) of the button(s) 914) and represented by X and Y coordinates. In some examples, a center of the contact point may define the location of the contact or the contact point may also be characterized by the area of the contact. Moreover, in some examples, the capacitive touch sensor may detect a magnitude of the contact point (i.e., how hard an object is pressing). In some examples, the button(s) 914 may also include a fingerprint scanner/reader for performing fingerprint recognition.

When the button(s) 914 is pressed, touched, and/or otherwise triggered, the processor(s) 902 may receive an output signal that may activate one or more functions of the electronic device (e.g., record image data, record audio, etc.).

The electronic device 900 may include the light ring 926 for backlighting or illuminating a perimeter of the button(s) 914.

The light sensor 910 may include one or more sensors capable of detecting the level of ambient light of the surrounding environment in which the electronic device 900 resides.

The electronic device 900 may further include one or more loudspeaker(s) 922 and/or one or more microphone(s) 924. The loudspeaker(s) 922 may be any electromechanical device capable of producing sound in response to an electrical signal input. The microphone(s) 924 may be an acoustic-to-electric transducer or sensor capable of converting sound waves into an electrical signal. In some instances, the electronic device 900 may include a single microphone 924. In other instances, the electronic device 900 may include two or more microphone(s) 924 spaced from one another (e.g., located on different sides of the electronic device 900) to provide noise cancelling and/or echo cancelling for clearer audio.

The loudspeaker(s) 922 and/or microphone(s) 924 may be coupled to the Codec 912 to enable digital audio to be decompressed and output by the loudspeaker(s) 922 and/or to enable audio data recorded by the microphone(s) 924 to be compressed into digital audio data. The digital audio data may be received from and transmitted to client device(s) 928 using the network interface(s) 916 and/or one or more components of the network. For example, when a user within an area of the electronic device 900 speaks, sound from the user is received by the microphone(s) 924 and compressed by the Codec 912. Digital audio data is then sent through the network interface(s) 916 and delivered to the client device(s) 928. In some examples, the speech recorded by the microphone(s) 924 may be used for voice recognition and authentication.

In some instances, the electronic device 900 may be battery powered using a battery 930 and/or may be powered using a source of external AC (alternating-current) power, such as mains power. When the battery 930 is depleted of its charge, the battery 930 may be recharged by connecting a power source to the battery 930 (e.g., using a USB connector).

The network interface(s) 916 may comprise an integrated circuit including a processor core, memory, and programmable input/output peripherals. The network interface(s) 916 may be operatively or communicatively connected to the processor(s) 902 to handle communication links between the electronic device 100 and other, external devices, external receivers, external transmitters, and/or external transceivers, and to route incoming/outgoing data appropriately. In some instances, the network interface(s) 916 may include wireless 916(*a*) and wired 916(*b*) adapters. For example, the network interface(s) 916 may include one or more wireless network interfaces, radios, receivers, transmitters, and/or transceivers configured to communicate across one or more wireless networks, such as, without limitation, Wi-Fi, cellular, Bluetooth, Z-Wave, ZigBee, LPWAN(s), and/or satellite networks.

In some instances, inbound data from may be routed through the network interface(s) 916 before being directed to the processor(s) 902, and outbound data from the processor(s) 902 may be routed through the network interface(s) 916. The network interface(s) 916 may therefore receive inputs, such as power and/or data, from the processor(s) 902, the camera(s) 904, the motion sensor(s) 906, the button(s) 914, and/or the non-volatile memory 920. For example, when the button(s) 914 receives touch input, the network interface(s) 916 may perform one or more functions, such as to transmit a signal over the wireless 916(A) connection and/or the wired 916(B) connection to a client device(s) 928. As another example, the network interface(s) 916 may be configured to transmit data to and/or receive data from one or more network devices. The network interface(s) 916 may act as a conduit for data communicated between various components and the processor(s) 902.

In some examples, the network interface(s) 916 may include at least a first network interface and a second network interface. In some instances, the first network interface may include a Bluetooth network interface and the second network interface may include a Wi-Fi network interface. The Bluetooth network interface and the Wi-Fi network interface may include a corresponding network interface for communicatively coupling with other devices.

For example, as discussed above, the electronic device 100 may include a first network interface 800, which in some instances may comprise a Bluetooth network interface, and a second network interface 802, which in some instances may comprise a Wi-Fi network interface. As also discussed above, in some instances, the first network interface 800 and the second network interface 802 may be disposed away from, or at an opposite end as the camera(s) 904 and/or the PIR sensors 200 of the electronic device. Moreover, in some instances, the first network interface 800 may be disposed on a first side (e.g., the first side 112) of the electronic device 100 and the second network interface 802 may be disposed on a second side (e.g., the second side 114) of the electronic device 100. In some examples, the electronic device 100 may communicate over Bluetooth and/or Wi-Fi based on which network devices the electronic device 100 is attempting to communicate with.

Discussed above, the electronic device 100 may include the volatile memory 918 and the non-volatile memory 920. The volatile memory 918 may comprise, for example, DDR3 SDRAM (double data rate type three synchronous dynamic random-access memory). The non-volatile memory 920 may comprise flash memory configured to store and/or transmit data. For example, in certain embodiments the non-volatile memory 920 may comprise serial peripheral interface (SPI) flash memory. In some embodiments, the non-volatile memory 920 may comprise, for example, NAND or NOR flash memory. Although in FIG. 9, the volatile memory 918 and the non-volatile memory 920 are illustrated being separate from the processor(s) 902, in some instances, the volatile memory 918 and/or the non-volatile memory 920 may be physically incorporated with the processor(s) 902, such as on the same chip (e.g., System on a Chip (SoC)). The volatile memory 918 and/or the non-volatile memory 920, regardless of their physical location, may be shared by one or more other components (in addition to the processor(s) 902) of the electronic device 00.

In some instances, the electronic device 900 may also include lighting element(s) 932 that activate one or more lights. For example, in response to the motion sensor(s) 906 and/or the camera(s) 904 detecting motion, the lighting element(s) 932 may receive an output signal from the processor(s) 902 that causes the lighting element(s) 932 to activate the one or more lights.

Figure 10A:
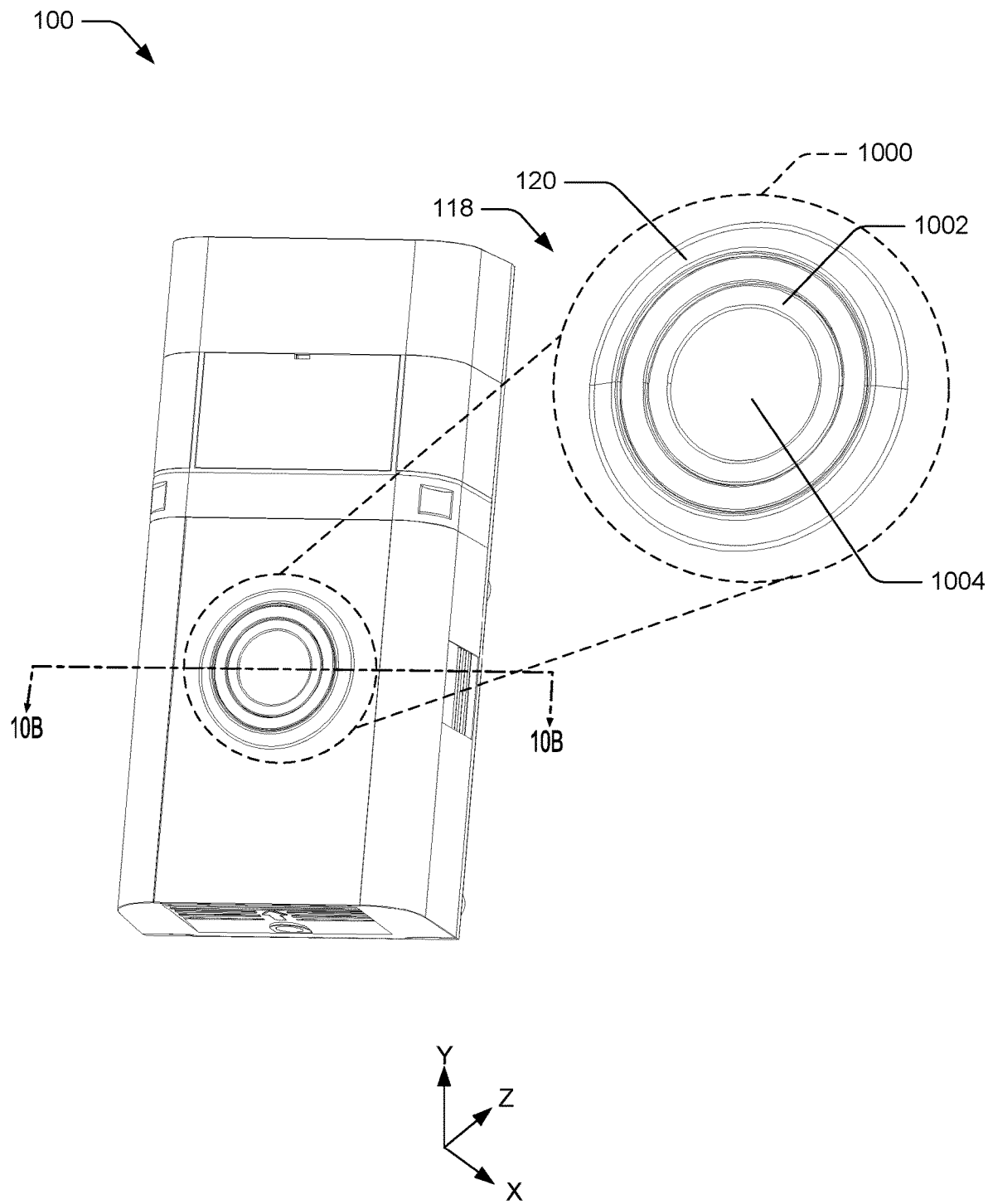
FIG. 10A illustrates an example button of the electronic device of FIG. 1, according to an embodiment of the present disclosure.
Figure 10B:
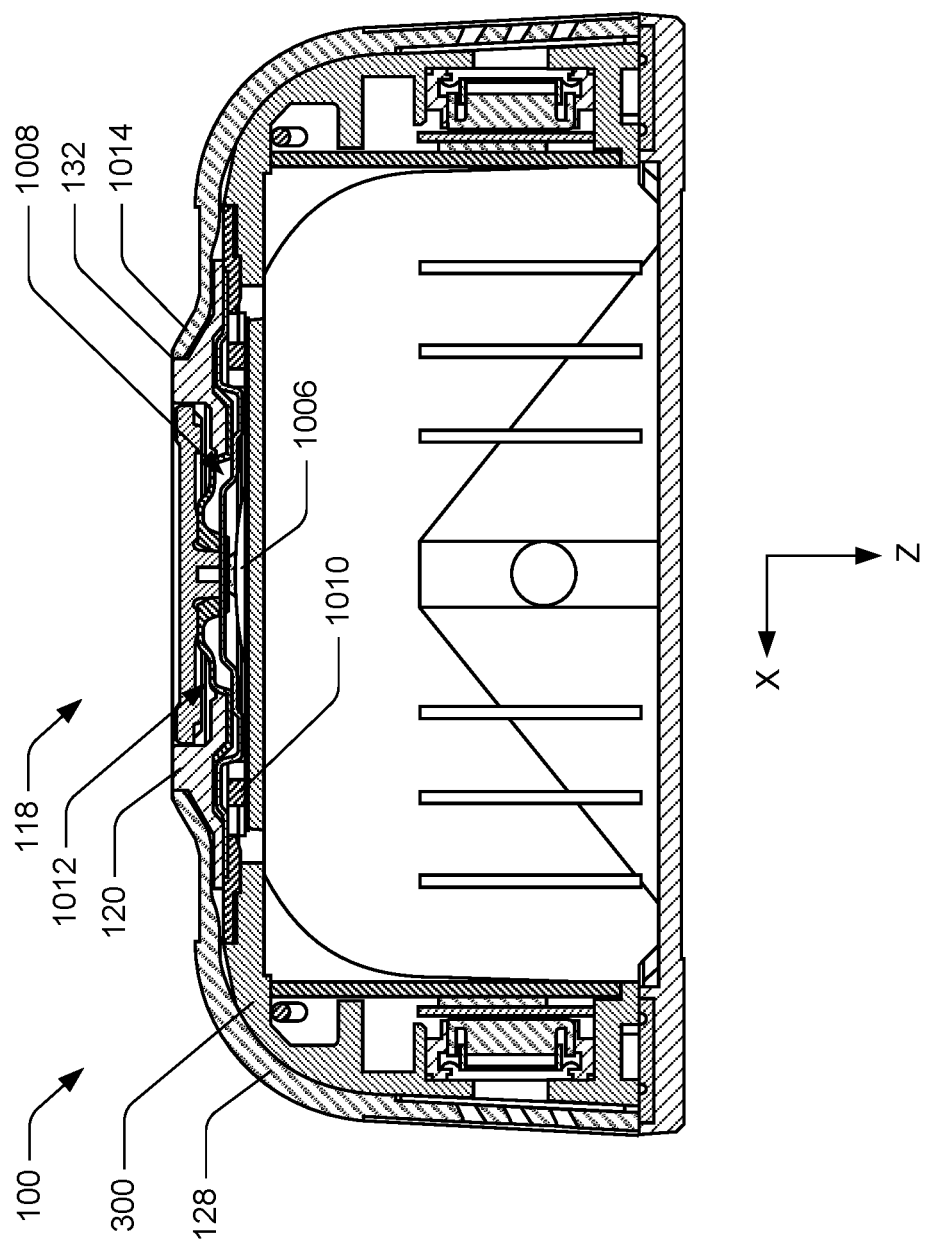
FIG. 10B illustrates a cross-sectional view of the electronic device of FIG. 1, taken along line 10B-10B of FIG. 10A, showing example components of the button of FIG. 10A, according to an embodiment of the present disclosure.

FIGS. 10A and 10B illustrate detailed views and example components of the button 118 of the electronic device 100. As shown in FIG. 10A, and the detailed view 1000, the button 118 may, in some instances, include a substantially circular shape. In some instances, the button 118 may include a raised boss 1002 that extends around a perimeter or circumference of the button 118. Within the raised boss 1002 may be a depression 1004, which in some instances may be sized to receive a finger or fingertip of the user. Additionally, as shown in the detailed view 1000, the light ring 120 may encircle the button 118.

With reference to FIG. 10B, the fourth cover 128 is shown coupled to the frame 300, and the button 118 is shown disposed through the opening 132 of the fourth cover 128. In some instances, the button 118 may reside within a receptacle, or recess, of the light ring 120.

The electronic device 100 may include a dome switch 1006 to provide mechanical action to the button 118. In some instances, the dome switch 1106 may couple to the frame 300 and reside behind the light ring 120 (Z-direction). The dome switch 1006 may give the button 118 tactility and mechanical action to enable the button 118 to be depressed by an applied force (e.g., from a finger of a visitor) and returned to a resting state after the applied force is removed. In this sense, the button 118 may comprise a mechanical switch, however, additionally or alternatively, the button 118 may comprise an electronic actuator (e.g., capacitive sensors, optical sensors, touch screen, or the like).

The electronic device 100 may further include a diffuser 1008 disposed behind the light ring 120 (Z-direction) and/or in front of the dome switch 1006 (Z-direction). In some instances, the light diffuser 1008 may be interposed between light sources 1010 (e.g., LEDs) and the light ring 120. In some instances, the diffuser 1008 may include a membrane, film, or any other light-scattering medium that diffuses light from the light sources 1010 radially spaced around the button 1008. The light diffuser 1008 may include geometries, such as indentations or protrusions, that limit "hot spots" and/or assist in diffusing light from the light sources 1010 to increase internal reflection within the light ring 120 and/or the light diffuser 1008. For example, the light diffuser 1008 may include serrated edges or ridges disposed adjacent to the light sources 1010 to scatter and disperse the light within the light diffuser 1008 and toward the light ring 120. As another example, the light diffuser 1008 may include one or more depressions or thinned regions around its circumference to further diffuse the light in the light ring 120. Accordingly, in some examples, the light ring 120 may substantially uniformly disperse light so that the light ring 120 provides a uniformly illuminated appearance when the light sources 1010 are illuminated.

In some instances, the electronic device 100 may further include a grommet 1012 (e.g., rubber grommet) interposed between the diffuser 1008 and the button 118. The grommet 1012 may comprise a resilient, elastomeric material (e.g., rubber) that may resist moisture intrusion. In some instances, the diffuser 1008 may include an opening through which a portion of the grommet 1012 extends to contact or abut the dome switch 1006. As also shown, the fourth cover 128 may include a raised area 1014 disposed around the button 118 and the light ring 120.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

Example Clauses

In a first aspect, a video doorbell comprising: a housing having a front, a top, a bottom, a first side, a second side, a first corner located between the front and the first side, and a second corner located between the front and the second side; a first passive infrared (PIR) sensor disposed at the first corner and oriented in a first direction; a second PIR sensor disposed at the front and oriented in a second direction that is different than the first direction; a third PIR sensor disposed at the second corner and oriented in a third direction that is different than the second direction; a first camera disposed at the front and oriented in the second direction, the first camera including a first type of camera; a second camera disposed at the first corner and oriented in a fourth direction that is different than the third direction, the second camera including a second type of camera that is different than the first type of camera; a third camera disposed at the front and oriented in the second direction, the third camera including the second type of camera; a fourth camera disposed at the second corner and oriented in a fifth direction that is different than the fourth direction, the fourth camera including the second type of camera; a first cover disposed over the first PIR sensor, the second PIR sensor, and the third PIR sensor; a second cover disposed over the first camera; and a third cover disposed over the second camera, the third camera, and the fourth camera.

In an embodiment of the first aspect, wherein: the first PIR sensor, the second PIR sensor, and the third PIR sensor are horizontally aligned in a first row; and the second camera, the third camera, and the fourth camera are horizontally aligned in a second row.

In another embodiment of the first aspect, wherein: the first PIR sensor, the second PIR sensor, and the third PIR sensor are located closer to the top of the video doorbell than the first camera; and the first camera is located closer to the top of the video doorbell than the second camera, the third camera, and the fourth camera.

In a second aspect, a camera device comprising: one or more motion sensors; a first camera, the first camera including a first type of camera having a first resolution, the first camera located closer to a bottom end of the device than the one or more motion sensors; a second camera, the second camera including a second type of camera having a second resolution that is lower than the first resolution, the second camera located closer to the bottom end of the device than the first camera; and a third camera, the third camera including the second type of camera.

In an embodiment of the second aspect, wherein: the one or more motion sensors comprise at least a first motion sensor and a second motion sensor; and at least one of: the first motion sensor is aligned with the first camera along a vertical axis; the second motion sensor is aligned with the first camera along the vertical axis; the second motion sensor is aligned with the first motion sensor along a horizontal axis; the second camera is aligned with the first camera along the vertical axis; or the third camera is aligned with the second camera along the horizontal axis.

In another embodiment of the second aspect, further comprising: a front; a first side; and a first corner located between the front and the first side, wherein: the second camera is disposed at the first corner and oriented in a first direction; and the third camera is disposed at the front and oriented in a second direction, the second direction being different than the first direction.

In another embodiment of the second aspect, further comprising: a front; a first side; a second side; a first corner located between the front and the first side; and a second corner located between the front and the second side, wherein: the second camera is disposed at the first corner and oriented in a first direction; and the third camera is disposed at the second corner and oriented in a second direction, the second direction being different than the first direction.

In another embodiment of the second aspect, further comprising a fourth camera, the fourth camera including the second type of camera, and wherein the fourth camera is disposed at the front.

In another embodiment of the second aspect, wherein the one or more motion sensors include: a first motion sensor disposed at the first corner and oriented in a third direction, the third direction being different than the first direction; a second motion sensor disposed at the front and oriented in a fourth direction; and a fifth motion sensor disposed at the second corner and oriented in a fifth direction, the fifth direction being different than the second direction.

In another embodiment of the second aspect, wherein: the one or more motion sensors include a first motion sensor, a second motion sensor, and a third motion sensor that are horizontally aligned in a first row; and the second camera, the third camera, and the fourth camera are horizontally aligned in a second row.

In another embodiment of the second aspect, further comprising: a first cover disposed over the one or more motion sensors; and a second cover disposed over the second camera, the third camera, and the fourth camera, wherein the second cover includes: a first recess having a first flat surface disposed in front of the second camera; and a second recess having a second flat surface disposed in front of the fourth camera.

In another embodiment of the second aspect, further comprising: a first end; a second end that is opposite to the first end; a first side; a second side that is opposite to the first side; a first antenna that is located closer to the second end than the first end and closer to the first side than the second side; and a second antenna that is located closer to the second end than the first end and closer to the second side than the first side, wherein the one or more motion sensors are located closer to the first end than the second end.

In another embodiment of the second aspect, wherein the first antenna and the second antenna are spaced apart from the first end by at least one inch.

In another embodiment of the second aspect, wherein at least one of: the first type of camera includes a color image sensor; the second type of camera includes a monochromic image sensor; or the first type of camera uses a greater amount of power than the second type of camera.

In a third aspect, a camera device comprising: a housing; a first motion sensor oriented in a first direction relative to the housing; a second motion sensor oriented in a second direction relative to the first direction; a third motion sensor oriented in third direction relative to the first direction; a first camera oriented in a fourth direction relative to the first direction; a second camera oriented in the second direction; and a third camera oriented in a fifth direction relative to the first direction.

In an embodiment of the third aspect, further comprising a fourth camera located between the second motion sensor and the second camera, wherein the fourth camera includes a first type of camera and the second camera includes a second type of camera.

In another embodiment of the third aspect, wherein at least one of: the first type of camera comprises a color image sensor; the second type of camera comprises a monochromic image sensor; or the first type of camera comprises a first resolution that is greater than a second resolution of the second type of camera.

In another embodiment of the third aspect, further comprising: a front; a first side; a second side; a first corner located between the front and the first side; and a second corner located between the front and the second side, wherein: the first motion sensor is located at the first corner; the third motion sensor is located at the second corner; the first camera is located at the first corner; and the third camera is located at the second corner.

In another embodiment of the third aspect, the first motion sensor, the second motion sensor, and the third motion sensor collectively include a first field of view (FOV); and the first camera, the second camera, and the third camera collectively include a second FOV that is less than the first FOV.

In another embodiment of the third aspect, a fourth camera oriented in the second direction, and wherein the fourth camera is disposed between one or more of the first motion sensor, the second motion sensor, or the third motion sensor and one or more of the first camera, the second camera, or the third camera.

What is claimed is:

1. An electronic device comprising:
a surface;
a first side;
a first corner located between the surface and the first side;
a second side;
a second corner located between the surface and the second side;
a first motion sensor disposed at the surface;
a second motion sensor disposed at the first corner;
a third motion sensor disposed at the second corner;
a first camera disposed at the surface, the first camera being a first type of camera having a first resolution and a color image sensor;
a second camera disposed at the surface, the second camera being a second type of camera having a second resolution that is lower than the first resolution and a monochromic image sensor;
a third camera disposed at the first corner, the third camera being the second type of camera; and
a fourth camera disposed at the second corner, the fourth camera being the second type of camera;
a first cover disposed over the first motion sensor, the second motion sensor, and the third motion sensor; and
a second cover disposed over the second camera, the third camera, and the fourth camera,
wherein: the second camera, the third camera, and the fourth camera are aligned along a first axis;
the first camera, the second camera, and the first motion sensor are aligned along a second axis;
the third camera and the second motion sensor are aligned along a third axis; and
the fourth camera and the third motion sensor are aligned along a fourth axis.

2. The electronic device of claim 1, wherein the first type of camera uses a greater amount of power than the second type of camera.

3. An electronic device comprising:
a surface;
a first side;
a first corner located between the surface and the first side;
a second side;
a second corner located between the surface and the second side;
a first motion sensor disposed at the surface;
a second motion sensor disposed at the first corner;
a third motion sensor disposed at the second corner;
a first camera disposed at the surface, the first camera being a first type of camera having a color image sensor, the first camera located closer to an end of the electronic device than the first motion sensor;
a second camera disposed at the surface and oriented in a first direction, the second camera being a second type of camera that is different than the first type of camera having a monochromic image sensor, the second camera located closer to the end of the electronic device than the first camera;
a third camera disposed at the first corner and oriented in a second direction, the third camera being the second type of camera, the third camera located closer to the end of the electronic device than the first camera;
a fourth camera disposed at the second corner and oriented in a fourth direction, the fourth camera being the second type of camera, the fourth camera located closer to the end of the electronic device than the first camera;
a first cover disposed over the first motion sensor, the second motion sensor, and the third motion sensor;
a second cover disposed over the second camera, the third camera, and the fourth camera; and
a button disposed at the surface, the button located closer to the end of the electronic device than the second camera, wherein:
the first camera, the second camera, the first motion sensor, and the button are aligned along a first axis;
the third camera and the second motion sensor are aligned along a second axis; and
the fourth camera and the third motion sensor are aligned along a third axis.

4. The electronic device of claim 3, wherein:
the second camera, the third camera, and the fourth camera are aligned along a fourth axis.

5. The electronic device of claim 3, wherein:
the first type of camera has a first resolution; and
the second type of camera has a second resolution that is different than the first resolution.

6. The electronic device of claim 3, wherein:
the first type of camera uses a first amount of power; and
the second type of camera uses a second amount of power that is different than the first amount of power.

7. The electronic device of claim 1, further comprising a button.

8. An electronic device comprising:
a surface;
a first side;
a first corner located between the surface and the first side;
a second side;
a second corner located between the surface and the second side;
a first motion sensor disposed at the surface;
a second motion sensor disposed at the first corner;
a third motion sensor disposed at the second corner;
a first camera disposed at the surface, the first camera being a first type of camera having a first resolution and a color image sensor;
a second camera disposed at the surface that includes a first lens, a first image sensor, and a first processor configured to perform first computer-vision processing, the second camera being a second type of camera having a second resolution that is lower than the first resolution and a monochromic image sensor;
a third camera disposed at the first corner, the third camera being the second type of camera that includes a second lens, a second image sensor, and a second processor configured to perform second computer-vision processing; and
a fourth camera disposed at the second corner, the fourth camera being the second type of camera;
wherein: the second camera, the third camera, and the fourth camera are aligned along a first axis;
the first camera, the second camera, and the first motion sensor are aligned along a second axis;
the third camera and the second motion sensor are aligned along a third axis; and
the fourth camera and the third motion sensor are aligned along a fourth axis.

9. The electronic device of claim 1, wherein:
the first camera has a first field of view (FOV) that includes a first horizontal angle;
the second camera has a second FOV that includes a second horizontal angle;
the third camera has a third FOV that includes a third horizontal angle;
the fourth camera has a fourth FOV that includes a fourth horizontal angle; and
a combined horizontal angle that is associated with the second horizontal angle, the third horizontal angle, and the fourth horizontal angle is substantially equal to the first horizontal angle.

10. The electronic device of claim 9, wherein:
the first horizontal angle defines a first lateral extent of the first FOV;
the second horizontal angle defines a second lateral extent of the second FOV;
the third horizontal angle defines a third lateral extent of the third FOV; and
the combined horizontal angle defines a fourth lateral extent of a combination of the second FOV, the third FOV, and the fourth FOV.

11. The electronic device of claim 1, wherein:
the first camera has a first field of view (FOV) that includes a first vertical angle;
the second camera has a second FOV that includes a second vertical angle;
the third camera has a third FOV that includes the second vertical angle;
the fourth camera has a fourth FOV that includes the second vertical angle the second vertical angle is different than the first vertical angle.

12. The electronic device of claim 1, wherein:
the first camera has a first field of view (FOV) that includes a first horizontal angle and a first vertical angle;
the second camera has a second FOV that includes a second horizontal angle and a second vertical angle;
the third camera has a third FOV that includes a third horizontal angle and the second vertical angle;
the fourth camera has a fourth FOV that includes a fourth horizontal angle and the second vertical angle;
a combined horizontal angle that is associated with the second horizontal angle, the third horizontal angle, and the fourth horizontal angle is substantially equal to the first horizontal angle; and
the second vertical angle is different than the first vertical angle.

13. The electronic device of claim 1, further comprising an input device, wherein the input device is aligned with the first camera along the second axis.

14. The electronic device of claim 1, further comprising at least one of:
a speaker;
a microphone;
a light sensor; or
a light emitter.

15. The electronic device of claim 3, wherein:
the second camera, the third camera, and the fourth camera are aligned along a fourth axis; and
the first motion sensor, the second motion sensor, and the third motion sensor are aligned along a fifth axis.

16. The electronic device of claim 3, wherein:
the first camera has a first field of view (FOV) that includes a first horizontal angle;
the second camera has a second FOV that includes a second horizontal angle;
the third camera has a third FOV that includes a third horizontal angle;
the fourth camera has a fourth FOV that includes a fourth horizontal angle; and
a combined horizontal angle that is associated with the second horizontal angle, the third horizontal angle, and the fourth horizontal angle is substantially equal to the first horizontal angle.

17. The electronic device of claim 3, wherein:
the first camera has a first field of view (FOV) that includes a first vertical angle;
the second camera has a second FOV that includes a second vertical angle;
the third camera has a third FOV that includes the second vertical angle;
the fourth camera has a fourth FOV that includes the second vertical angle the second vertical angle is different than the first vertical angle.

18. The electronic device of claim 3, further comprising at least one of:
a speaker;
a microphone;
a light sensor; or
a light emitter.

19. The electronic device of claim 8, wherein:
the first camera has a first field of view (FOV) that includes a first horizontal angle;
the second camera has a second FOV that includes a second horizontal angle;
the third camera has a third FOV that includes a third horizontal angle;
the fourth camera has a fourth FOV that includes a fourth horizontal angle; and
a combined horizontal angle that is associated with the second horizontal angle, the third horizontal angle, and the fourth horizontal angle is substantially equal to the first horizontal angle.

20. The electronic device of claim 19, wherein:
the first horizontal angle defines a first lateral extent of the first FOV;
the second horizontal angle defines a second lateral extent of the second FOV;
the third horizontal angle defines a third lateral extent of the third FOV; and
the combined horizontal angle defines a fourth lateral extent of a combination of the second FOV, the third FOV, and the fourth FOV.

21. The electronic device of claim 8, wherein:
the first camera has a first field of view (FOV) that includes a first vertical angle;
the second camera has a second FOV that includes a second vertical angle;
the third camera has a third FOV that includes the second vertical angle;
the fourth camera has a fourth FOV that includes the second vertical angle the second vertical angle is different than the first vertical angle.

* * * * *